US012522482B1

(12) United States Patent
Habers

(10) Patent No.: US 12,522,482 B1
(45) Date of Patent: Jan. 13, 2026

(54) ADJUSTABLE WEAR BLOCK FOR MAST SYSTEMS

(71) Applicant: Hyster-Yale Group, Inc., Fairview, OR (US)

(72) Inventor: Niek Habers, Weurt (NL)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 0 days.

(21) Appl. No.: 18/207,879

(22) Filed: Jun. 9, 2023

(51) Int. Cl.
B66F 7/28 (2006.01)
F15B 15/26 (2006.01)

(52) U.S. Cl.
CPC .............. B66F 7/28 (2013.01); F15B 15/26 (2013.01)

(58) Field of Classification Search
CPC ............. B66F 9/08; B66F 7/28; F16C 29/001
See application file for complete search history.

(56) References Cited

U.S. PATENT DOCUMENTS

| 4,417,769 A * | 11/1983 | Chelin ..................... F16C 29/02 187/238 |
| 4,442,922 A | 4/1984 | Johannson |
| 4,709,786 A | 12/1987 | David et al. |
| 4,759,452 A | 7/1988 | Faint et al. |
| 5,183,018 A | 2/1993 | Vittorio et al. |
| RE46,172 E | 10/2016 | Dosso et al. |
| 9,950,911 B2 | 4/2018 | Fortunato et al. |
| 10,066,363 B1 | 9/2018 | McGee, Jr. et al. |
| 10,550,886 B2 * | 2/2020 | Sweeney ................. F16C 33/20 |
| 10,662,035 B2 | 5/2020 | Cunningham |
| 11,041,526 B1 | 6/2021 | Calago et al. |
| 11,111,957 B1 * | 9/2021 | Goslawski ............ F16C 29/126 |
| 11,772,209 B1 * | 10/2023 | Larew ................. E21D 23/0078 29/402.08 |
| 12,122,647 B2 * | 10/2024 | Holden ..................... E02F 3/38 |
| 2002/0145278 A1 | 10/2002 | Hulse et al. |

FOREIGN PATENT DOCUMENTS

| CA | 1299528 C | 4/1992 |
| CN | 210859608 U | 6/2020 |
| CN | 212764437 U | 3/2021 |
| DE | 3801101 C2 | 2/1996 |
| EP | 2612836 A1 * | 7/2013 ................ B66F 9/08 |

(Continued)

OTHER PUBLICATIONS

European Search Report, EPO Patent Appl. 24177417.3 (Nov. 28, 2024).

Primary Examiner — Diem M Tran

(57) ABSTRACT

An adjustable wear block for a mast system can include a housing and a wear pad arranged on an adjustable base within the wear block housing. In one embodiment, the wear block, wear pad, and adjustable base all have a circular cross-section. Threading on the outside of the base can match threading on an inner wall of the housing. As the base is rotated within the housing, the position of the base and the attached wear pad can be adjusted with respect to the housing. A hole can be provided through a channel or mast wall to permit an adjustment tool to be used to adjust the position of the base with respect to the housing after the wear block is secured to the carriage or mast. In an alternate embodiment, a hydraulic piston can drive the position of the wear pad with respect to the wear block housing.

24 Claims, 25 Drawing Sheets

(56) References Cited

FOREIGN PATENT DOCUMENTS

| | | | |
|---|---|---|---|
| EP | 3209596 B1 | 8/2017 | |
| EP | 3431667 A1 | 1/2019 | |
| FR | 2845678 A1 * | 4/2004 | ................ B66F 9/08 |
| GB | 190930254 A | 3/1910 | |
| GB | 309691 A | 4/1929 | |
| GB | 2452851 B | 9/2010 | |
| KR | 890001401 Y1 * | 4/1989 | |

\* cited by examiner

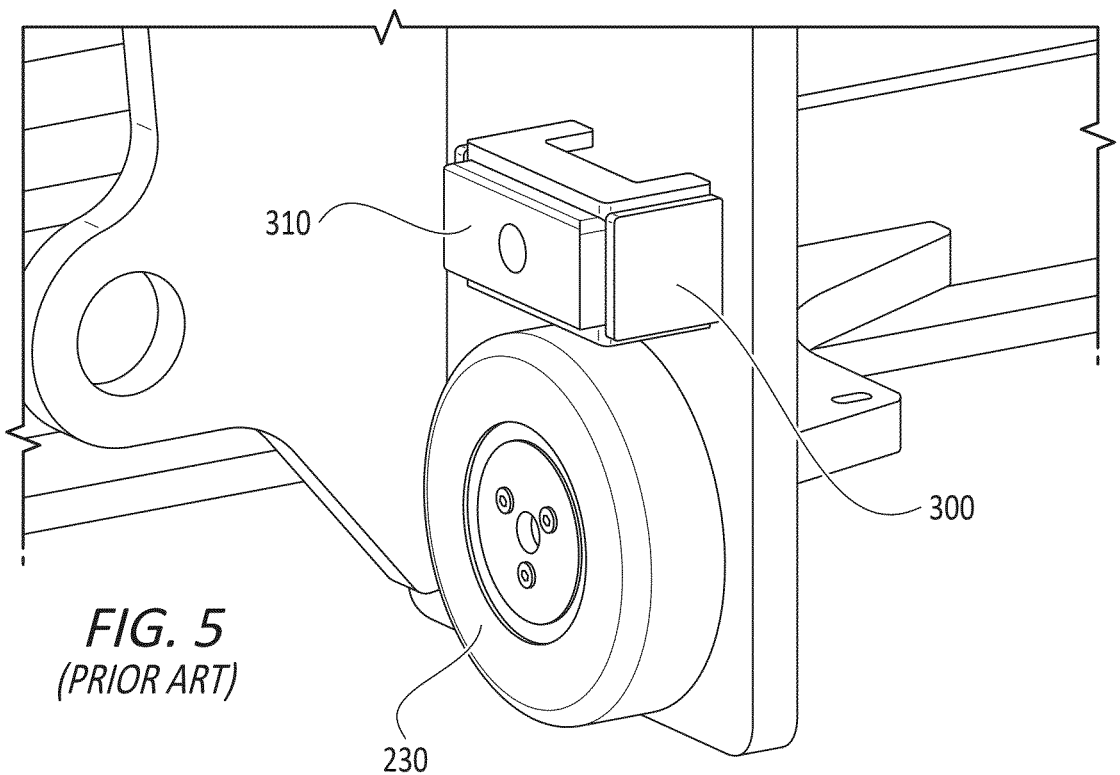
FIG. 5
*(PRIOR ART)*
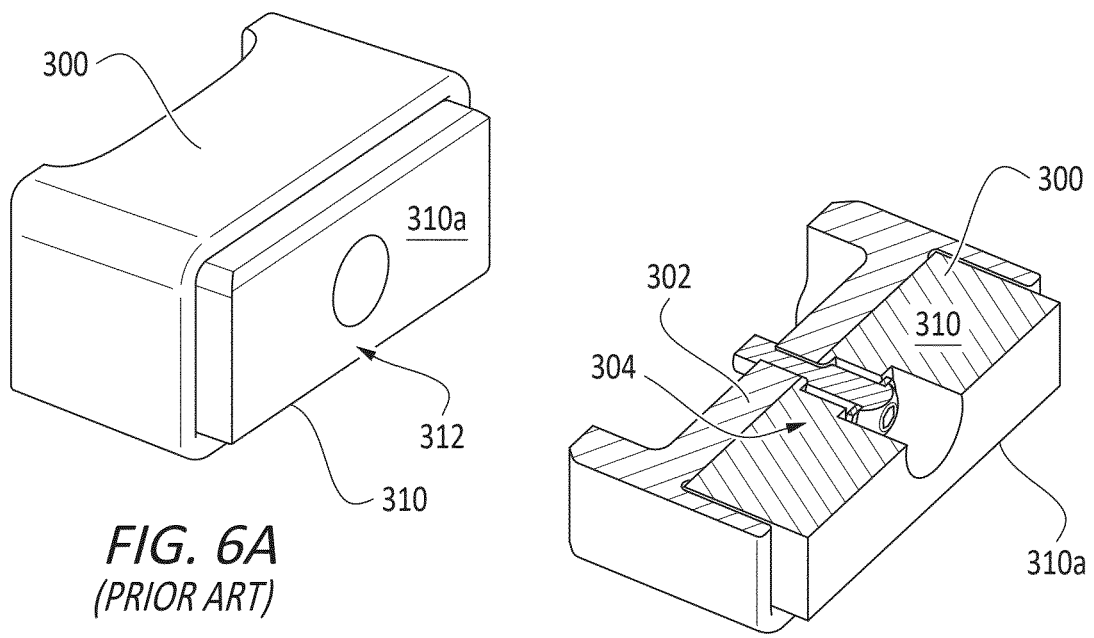
FIG. 6A
*(PRIOR ART)*
FIG. 6B
*(PRIOR ART)*

ADJUSTABLE WEAR BLOCK FOR MAST SYSTEMS

TECHNICAL FIELD

This disclosure relates generally to mast systems for lift trucks or booms for reach trucks (stackers) and more specifically to methods and mechanisms for absorbing forces in mast systems for lift trucks or reach trucks (stackers) to avoid damage to carriage and mast components.

BACKGROUND INFORMATION

Conventional lift trucks and stackers have mast or other lift systems (i.e., booms) comprising carriages with lift forks arranged on masts (or booms) that raise and lower the carriages to pick and carry loads. Forward and rearward forces on the carriage are absorbed by rollers (or guide bearings) mounted on the carriage or mast and arranged within a mast channel. A desired amount of clearance is provided between the rollers and the channel sidewalls such that only one sidewall or the other contacts the roller in response to a forward or rearward force on the carriage to absorb the force and to keep the rollers positioned within the mast channel as the carriage is raised and lowered.

Top and bottom wear blocks are arranged on the carriage between the carriage and the mast channel to keep the inner wall of the mast channel from impacting directly against carriage components, such as the rollers. In multi-stage lifts, wear blocks can also be arranged at the top and bottom of additional mast channels to absorb side-to-side forces on mast rails. The wear pads are generally arranged as far apart as possible (typically close to the rollers) to absorb side-to-side (sideways) forces on the carriage or mast rails that occur during lifting of loads or truck travel while carrying loads on the lift forks. The wear blocks are attached to the carriage or mast rails by welding, bolts, or other mechanical or chemical connection. Wear pads are arranged in the wear blocks and may be secured by a threaded bolt arranged through a center of the wear pad and threaded into a receiving hole in a base of the wear block.

Some clearance must be maintained between the mast channel wall and the wear pads to permit proper operation of the lift. The wear surface of the wear pad must therefore be maintained at a desired distance (e.g., clearance) from the channel wall to absorb the sideways forces without impairing the lift operation. However, because the wear pads are designed to wear down over time, the distance between the wear pad and the channel wall is difficult to maintain at a constant level. If the clearance is too great, it can permit too much play (side-to-side movement) of the carriage and/or mast rails as they are raised and lowered, causing additional wear on the lift components and possibly metal-to-metal contact or scraping. If the clearance is too little, binding or sticking can occur during the lifting and lowering operations, interfering with the lift's proper operation.

In addition, the wear pads eventually wear out completely. If the pads are not timely replaced, metal-to-metal scraping can occur that can cause damage to the channel wall and other lift components and will require the truck to be brought in for servicing. Unfortunately, because of the wear blocks' locations between the mast and mast rails or between the mast and carriage, servicing or replacement of the wear pads is extremely difficult and time consuming. Generally, to access the wear pads, the truck must be brought back to the dealer or service center for servicing. The carriage and/or mast must often be removed to access the pad locations and to service or replace the wear pads. Sometimes, dedicated gaps may be provided in the mast channels to permit easier access to the wear pads. Although the gaps make access easier, it is still difficult to replace or service the wear blocks through these gaps.

It is desirable to use up as much of the wear pad material as possible before replacement. Conventionally, each mast leaving the factory may be shimmed uniquely for that mast. Because of the production process, each mast channel differs in straightness. Accordingly, in the factory, each mast is measured to find its most narrow point. That dimension is then used to determine the number of shims required for the wear pad leaving the factory. As the wear pad is used, one or more additional metal shims or shimming pads having a desired thickness can be placed in the wear block beneath the pad to push the pad outward to its original distance and allow a greater amount of the wear pad material to be worn down. In order to be able to shim the pads, the original distance from mast or carriage surface to pad surface should be known. Currently, however, that number is not provided with the mast for future servicing. And, regardless, it would still be difficult to measure out the shims to get the correct clearance.

Accordingly, because of the difficulty in accessing the wear blocks and measuring out the correct shims, rather than shim to adjust the pad position, the pads are often wholly replaced before they are completely worn in order to avoid the difficulty of repeated pad adjustments. Swapping out the wear pads instead of shimming makes sure that in the field the clearance for that mast is the same as when it left the factory. While saving labor, this results in wasted materials and therefore additional materials costs. Accordingly, although conventional wear pad systems are able to absorb impacts and help avoid damage to mast and carriage components, they are difficult to access to service or replace and therefore expensive to maintain. It would be advantageous to have a wear pad system that can be more easily serviced and adjusted.

OVERVIEW OF DISCLOSURE

A conventional lift truck has multiple wear blocks with wear pads arranged along a carriage and/or mast channel to absorb side-to-side forces in the mast system. The wear pads are ideally arranged as far apart from each other as possible to maximize the ability to absorb the sideways forces. As noted previously, however, conventional wear pads may be difficult to access to service or replace.

According to principles of the present inventive concepts, a wear block is designed and mounted to a carriage or mast channel in a manner that permits the wear pad height, such as a distance projecting away from a surface, to be easily adjusted to position a wear (contact) surface of the wear pad at a proper distance (clearance) from the opposite channel wall to absorb sideways forces and to prevent damage to carriage/mast components without interfering with lift operations.

More specifically, in one embodiment, an adjustable wear block is provided having an easily adjustable wear surface position (or wear pad height). A circular housing having internal ramped surface, such as threads, is attached to the carriage or mast rail so as to be arranged between the carriage or mast rail and a mast channel wall when the carriage or mast rail is mounted to the mast. The wear block housing can be attached to the carriage or mast rail by welding, bolts, adhesive, or other mechanical or chemical connection. A threaded base (formed of metal or other rigid material) is arranged in the housing such that its position within the housing can be adjusted by rotating the metal base with respect to the housing. A wear pad is attached to the base using one or more fasteners, an adhesive, or other connection mechanism. In one embodiment, three threaded bolts are used to secure the wear pad to the rotatable base. A hexagonal hole or other tool receptacle can be arranged in or through a center of the base to permit a tool to be inserted therein to rotate the base with respect to the housing. As the base is rotated, the wear pad is either extended further from or retracted into the housing depending on the direction of rotation of the base. One or more locking holes can also be provided in the base to receive locking screws or pins that prevent rotation of the base when inserted, or other mechanisms can be provided to lock the position of the base. The locking screws can, for instance, be threaded bolts that are threaded into the locking holes. Matching holes can be arranged through the carriage or mast sidewall to which the wear block is attached to receive the locking screws or pins and the adjustment tool. A plug or cap may be used to cover a tool receptacle hole in the carriage or mast wall before and after adjustment of the wear pad height.

The adjustable wear block can be made to easily retrofit to existing lift trucks such as by replicating a connection mechanism of the conventional wear block. For example, screw holes can be arranged in locations on the adjustable wear block that match the mounting screws on or through the carriage or mast mounting surface. Additional holes can be formed through the carriage or mast mounting wall to provide access to the locking holes and tool receptacle.

In one embodiment, a clearance of the wear pad can be set to a desired distance by first adjusting the wear pad to a height where the wear surface contacts the mast channel wall and then rotating the base backwards by two full rotations of the adjustment tool (and therefore the base). Additionally, a sticker or other markings can be placed around the tool receptacle hole with divisions indicating a relationship between the rotation of the adjustment tool and the height adjustment (or linear travel distance) of the wear pad. In one embodiment, the base and housing each have a 6 mm thread pitch and each segment on the sticker can represent 0.5 mm of linear travel of the wear pad.

Because the adjustable wear pad system described above has a known pitch, setting the correct clearance is easy: Just turn the baseplate till you hit the channel and then turn it back as many revolutions required to match the factory clearance. A label can be provided from the manufacturer on the mast listing the correct clearance for that specific mast.

In another embodiment, the height of the wear pad can be hydraulically adjusted to maintain a desired clearance with the mast channel wall. In one embodiment, a wear pad is arranged on or in communication with a hydraulic piston within a wear block. The wear pad and hydraulic piston can, for example, be the same size and shape in cross-section, or the hydraulic piston can be arranged to push a base plate or wear pad of any other desired shape. In other embodiments, the wear pad itself may be the hydraulic piston.

A hydraulic fluid valving system may be provided that ensures that the wear pad is arranged with the desired clearance from the mast channel wall. An oil feed can be provided to feed oil into a hydraulic cylinder behind the hydraulic piston that drives the wear pad. The oil feed is preferably supplied through a first cylinder having a piston arranged therein that can slide forward and backward throughout the length of the first cylinder. The first cylinder can have a fluid volume defined such that one stroke of the piston corresponds to a predetermined linear travel distance of the wear pad. The predetermined linear travel distance can, for example, be approximately about 2 mm. A check valve can be arranged through the piston so that oil is supplied through the piston into the hydraulic cylinder once the piston travels fully forward within the first cylinder. The check valve can include a preload spring that requires a predetermined force (pressure) before opening. The predetermined pressure can, for instance, be approximately about 1 bar. The check valve prevents oil from returning back into the oil feed.

In operation, oil is supplied from the oil feed to the piston in the first cylinder. The piston is driven forward through the first cylinder until it reaches the end of the first cylinder. As the piston travels forward, it drives the fluid from the first cylinder into the hydraulic cylinder behind the wear pad. As the fluid enters the hydraulic cylinder, it forces the wear pad outward. Since the first cylinder volume is defined such that full movement of the piston equals a predetermined distance (e.g., 2 mm) movement of the wear pad, the wear pad will be forced to move the predetermined linear distance by the movement of the piston or until the wear pad contacts the mast channel wall. If, after the piston travels its full distance, there is still clearance between the wear pad and the mast, the check valve will open and permit additional oil to be supplied through the check valve into the hydraulic cylinder, causing the wear pad to continue to move until it makes contact with the mast. Once the wear pad contacts the mast, the hydraulic piston cannot move any further and the hydraulic cylinder cannot receive any more oil. When the cylinder cannot receive any more oil, the oil feed then stops or is stopped. With the oil feed stopped, the piston in the first cylinder is then free to move back to its original position as force is applied to the wear pad. As forces from the mast act on the wear pad, the wear pad pushes fluid from the hydraulic cylinder back into the first cylinder, driving the piston back towards its original position. Because the first cylinder volume corresponds to a predetermined linear travel distance of the wear pad, the wear pad can be forced back by up to the predetermined distance before the piston reaches its original position and further movement of the wear pad is prevented. In this manner, the clearance can be set to a predetermined distance by selecting a desired fluid volume for the first cylinder. Other ways of providing a predetermined distance of back travel are also contemplated. The key is that there is a set space/volume present in the hydraulic system that permits a certain amount of back travel of the wear pad to adjust the pad to its desired clearance.

In one embodiment, the amount of clearance can be made adjustable. For instance, the first cylinder can be provided with additional volume and an adjusting screw or other travel limiter can be provided to set the travel distance of the first piston and therefore the corresponding maximum linear travel distance of the wear pad. By adjusting the permitted linear travel distance of the wear pad, the clearance can be adjusted and set as desired. In another embodiment, a second piston can be provided that controls a valve to determine when the oil is supplied to the hydraulic cylinder, such as when a mast is centered. The second piston can be arranged in a second cylinder with a retraction spring biasing it toward a closed position. The oil feed can be selectively supplied to the first cylinder through the second cylinder only when the second piston opens the valve. When the mast is centered, the second piston can open the valve to permit oil to flow into the first cylinder. In this manner, the wear pad position is set when the mast is centered. A dump can be provided from a first end of the first cylinder (opposite the hydraulic cylinder) to permit the release of oil from the first end of the first cylinder when the first piston moves backwards.

Other embodiments provide an automatically adjusting wear block that automatically adjusts a height of the wear pad to provide a desired clearance with the mast channel wall. In one embodiment, an automatically adjusting wear block can include a wear block housing, a wear pad arranged in the housing, and a hydraulic system for adjusting the height of the wear pad. A button can be arranged on the wear block housing beside the wear pad to force the wear pad outward when depressed. A ramp can be provided along the mast channel to activate the button when the carriage/mast reaches a certain desired adjustment point along its travel.

In one embodiment, a hydraulic piston in a master cylinder is connected to a button. A ramp in the mast channel is configured to contact the button at the desired adjustment point during carriage/mast travel. When the ramp contacts the button, the button is depressed and the connected hydraulic piston forces hydraulic fluid from the master cylinder into a slave cylinder, driving a second hydraulic piston that forces the wear pad outward. Retention springs can be provided between the wear block and wear pad to keep the wear pad inside a receptacle of the wear block. A shim plate can be provided in the mast channel at the adjustment point in the carriage/mast travel to ensure that the wear pad extends only to the shim plate. This keeps the appropriate clearance with the mast channel wall. Alternatively, a first piston and cylinder assembly similar to that described earlier can be used to set a clearance for the wear pad. Check valves can be provided between the fluid reservoir and the master cylinder and between the master cylinder and the slave cylinder to ensure that the hydraulic fluid only flows in one direction.

In an alternative embodiment, the auto adjusting wear pads can also be automatically aligned with the channel. Two or more slave cylinders can be provided along the wear block to drive different areas of the wear pad. By providing multiple slave cylinders connected to different areas of the wear pad, each separate area of the wear pad can be driven by the appropriate amount to contact the shim plate in the channel or channel wall. In this way, different areas of the wear pad can extend from the wear block by different amounts to better match the alignment of the channel wall.

In yet another embodiment, the wear block and wear pad can have a circular cross-section. The wear pad can be arranged on a piston (such as using one or more threaded bolts) that is slidably arranged in a receptacle of the wear block. One or more O-rings can be provided around the piston to prevent hydraulic oil or grease from leaking. An oil/grease fitting can be arranged at a bottom of the wear block to supply oil/grease to the piston to drive it and the connected wear pad outward. One or more grease lines or oil supply lines can be used to supply oil/grease to one or more of the wear blocks from a single grease point or multiple grease points. The operator can use a grease gun or other hydraulic fluid supply to force oil/grease into the grease points and through the grease lines to drive the piston(s) outward. Shim plates can be used to provide a stop point for the outward movement of the wear pads and to ensure a proper clearance with the channels or a first piston and cylinder assembly similar to that described earlier can be used to set a desired clearance.

Additional aspects and advantages will be apparent from the following detailed description of example embodiments, which proceeds with reference to the accompanying drawings.

BRIEF DESCRIPTION OF THE DRAWINGS

The foregoing and additional objects, features, and advantages of the present inventive concepts will become more readily apparent from the following detailed description of preferred embodiments, depicted in the attached drawings, in which:

FIG. 5 is a close-up view of a conventional wear block and wear pad arranged on the carriage of FIG. 4.

FIG. 6A is an isometric illustration of the conventional wear block and wear pad.

FIG. 6B is a cross-sectional view of the wear block and wear pad of FIG. 6A.

DETAILED DESCRIPTION OF EMBODIMENTS

Figure 1:
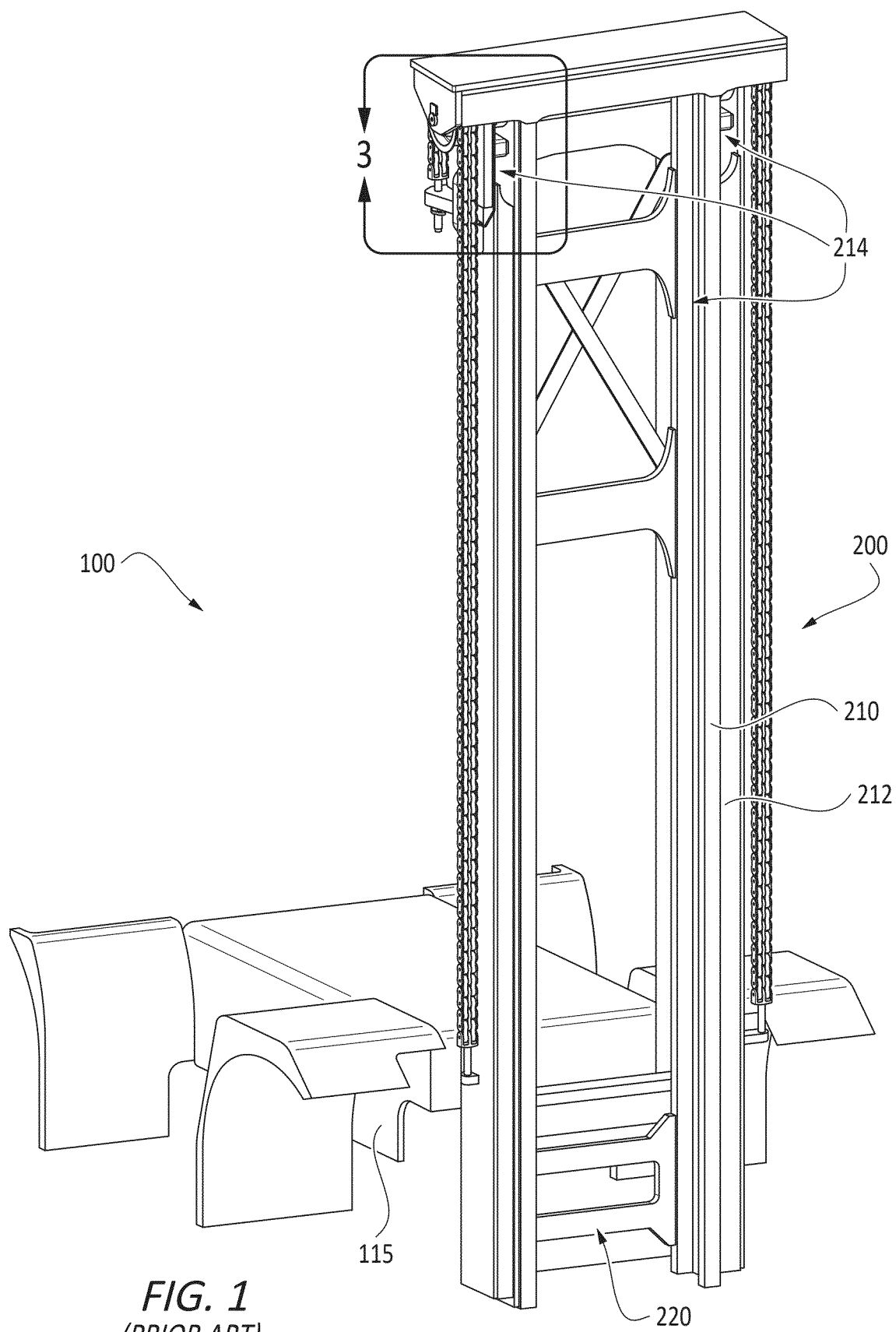
FIG. 1 is an isometric illustration of a frame and mast system for a conventional reach/lift truck.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete and will convey the scope of the disclosure to those skilled in the art.

Figure 2:
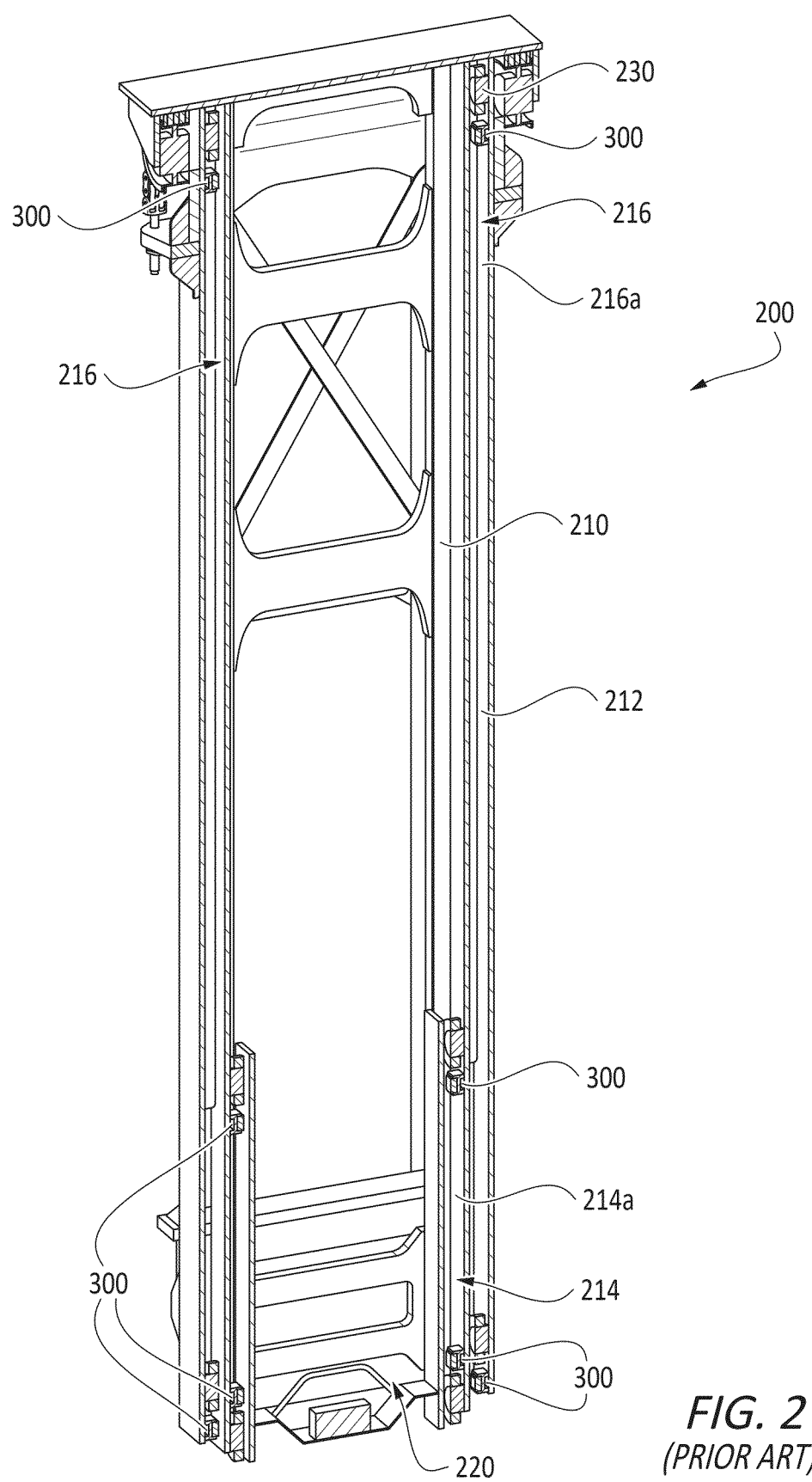
FIG. 2 is a cross-sectional view of the mast system of FIG. 1.
Figure 3:
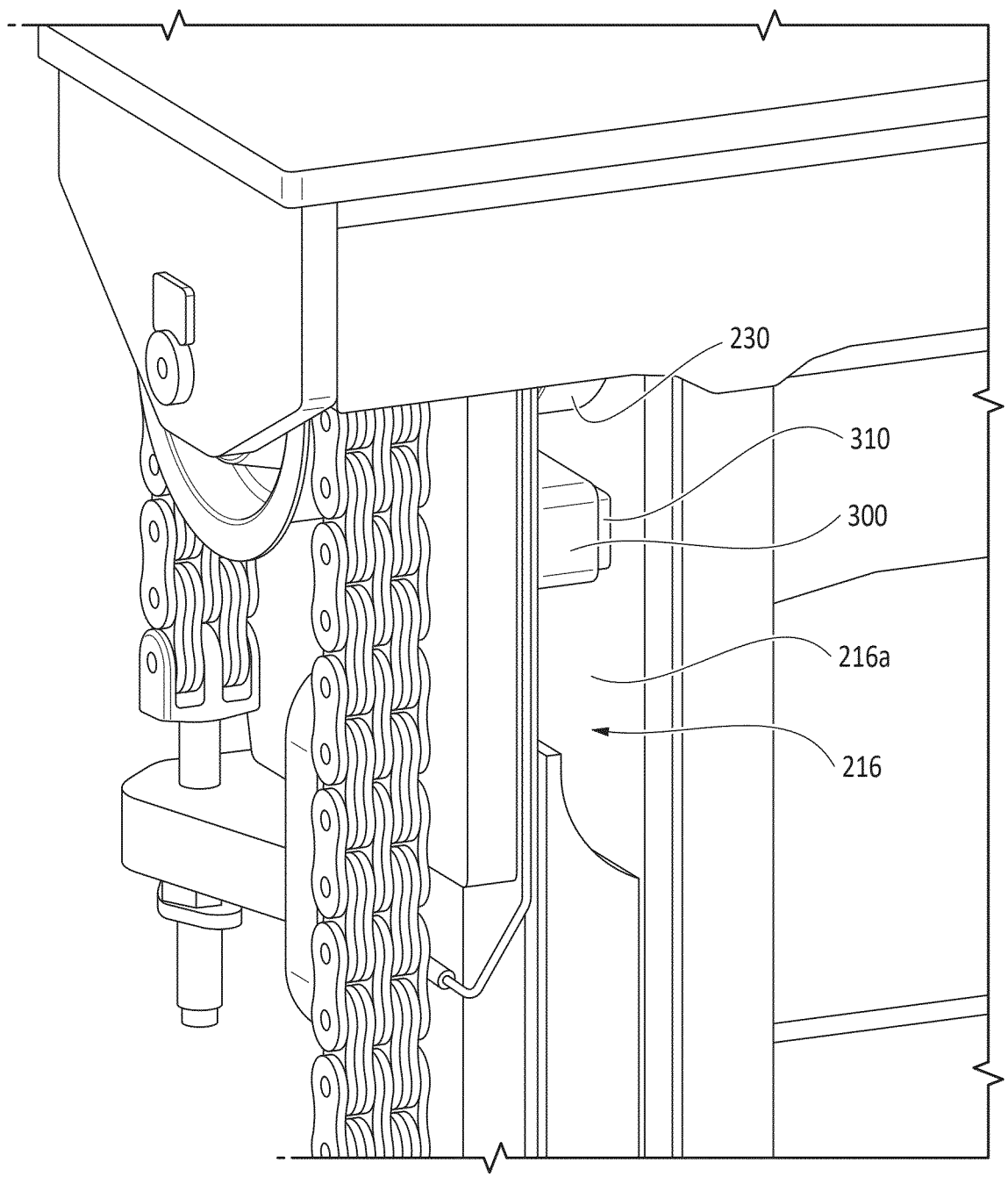
FIG. 3 is a close-up view of area 3 of FIG. 1.
Figure 4:
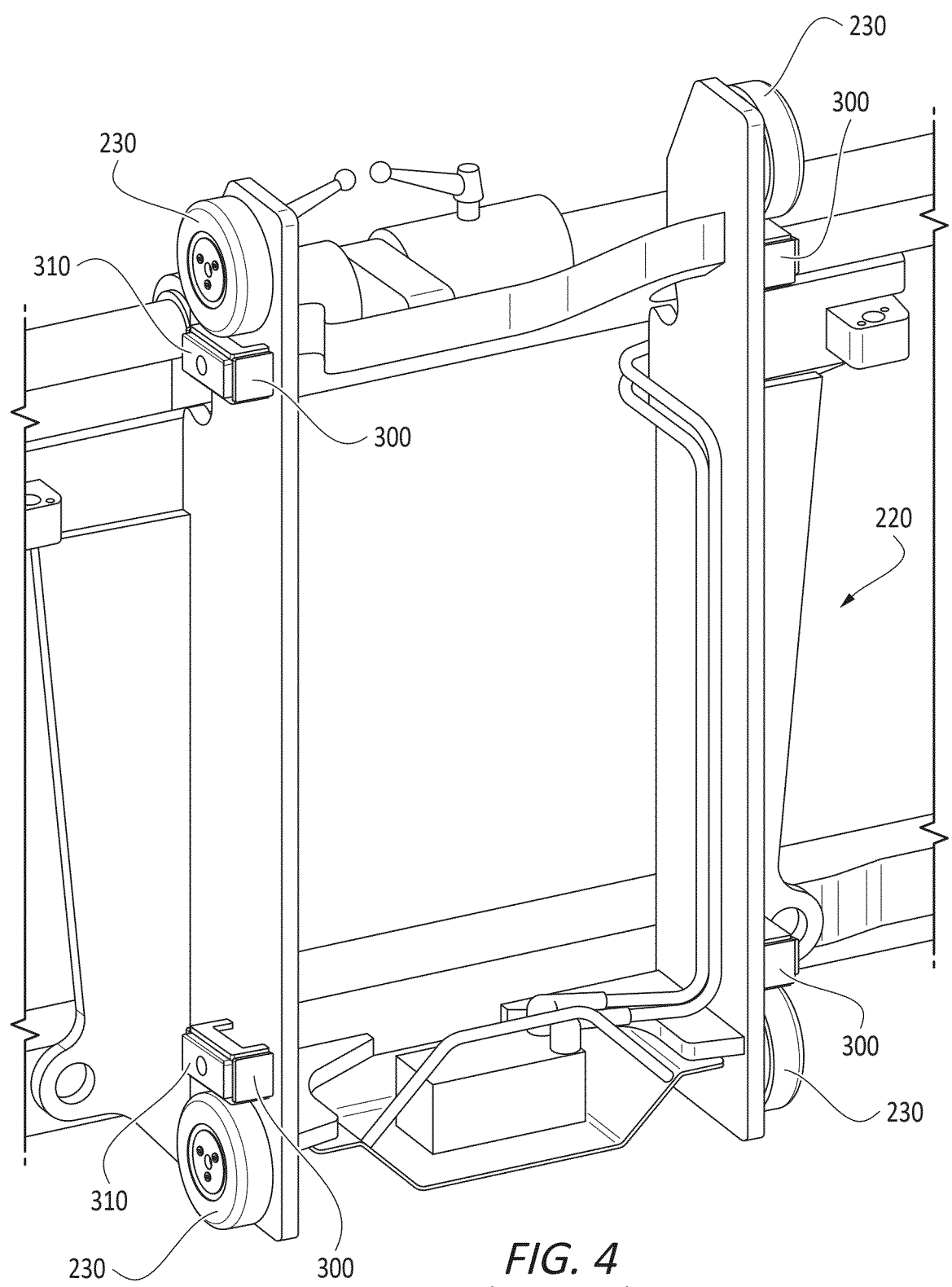
FIG. 4 is an isometric illustration of a carriage from the mast system of FIG. 1.

FIG. 1 is an isometric illustration of a frame 115 and mast system 200 for a conventional reach/lift truck 100. FIG. 2 is a cross-sectional view of the mast system 200 of FIG. 1. FIG. 3 is a close-up view of area 3 of the mast system 200 of FIG. 1. FIG. 4 is an isometric illustration of a carriage 220 that can be attached to the mast system 200 of FIG. 1. FIG. 5 is a close-up view of a conventional wear block 300 and wear pad 310 arranged on the carriage 220 of FIG. 4. FIG. 6A is an isometric illustration of the conventional wear block 300 and wear pad 310 of FIG. 5. And FIG. 6B is a cross-sectional view of the wea block 300 and wear pad 310 of FIG. 6.

Referring first to FIGS. 1-6B, a conventional lift truck 100 has a frame 115 on which a mast system 200 is arranged. Conventional mast or lift systems 200 comprise carriages 220 having lift forks (not shown) mounted to the carriages 220. The carriages 220 are raised and lowered along the masts 210 to pick and carry loads. Forward and rearward forces on the carriage 220 are absorbed by rollers (or guide bearings) 230 mounted on the carriage 220 and arranged within the mast channel 214. A desired amount of clearance is provided between the rollers 230 and the front and rear channel sidewalls such that only one sidewall or the other contacts the roller 230 in response to a forward or rearward force on the carriage 220 to absorb the force and keep the rollers 230 positioned within the mast channel 214 as the carriage 220 is raised and lowered.

Top and bottom wear blocks 300 are arranged on the carriage 220 between the carriage 220 and the mast channel inner wall 214a to keep the inner wall 214a of the mast channel 214 from impacting directly against the carriage components, such as the carriage rollers 230. The wear blocks 300 are generally arranged as far apart as possible (typically close to the carriage rollers 230) to absorb side-to-side (sideways) forces on the carriage 220 that occur during lifting of loads or truck travel while carrying loads on the lift forks. The wear blocks 300 are attached to the carriage 220 by welding, bolts, or other mechanical or chemical connection. Wear pads 310 are arranged in the wear blocks 300 and secured by a threaded bolt 302 arranged through a hole 312 in the center of the wear pad 310 and threaded into a receiving hole 304 in the base of the wear block 300. In multi-stage lifts, wear blocks 300 can also be arranged at the top and bottom of additional mast channels 216 to absorb side-to-side forces on mast rails 212 and to keep mast channel walls 216a from impacting mast components such as rollers 230.

Some clearance must be maintained between the mast channel inner walls 214a, 216a and the wear pads 310 to permit proper operation of the lift system 200. The wear surface (outermost surface) 310a of the wear pad 310 must therefore be maintained at a desired distance (e.g., clearance) from the channel wall 214a, 216a to absorb the sideways forces without impairing the lift operation. However, because the wear pads 310 are designed to wear down over time, the distance between the wear pad 310 and the channel wall 214a, 216a is difficult to maintain at a constant level. If the clearance is too great, it can permit too much play (side-to-side movement) of the carriage 220 and/or mast rails 212 as they are raised and lowered, causing additional wear on the lift components. If the clearance is too little, binding or sticking can occur during the lifting and lowering operations, interfering with the proper operation of the lift system 200. If the wear pads 310 wear out completely, metal-to-metal contact can occur that can damage mast or carriage components. As noted previously, however, conventional wear pads 310 may be difficult to access to service, adjust, or replace.

Figure 7:
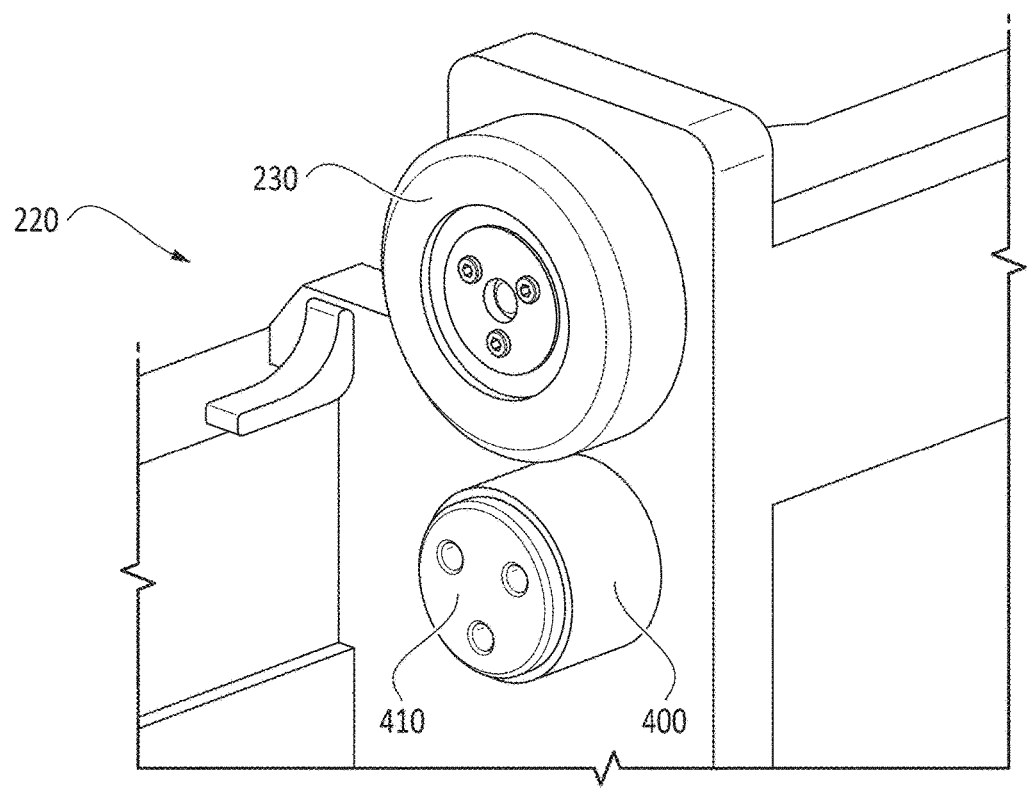
FIG. 7 is an isometric view of a wear block and wear pad according to principles of the present inventive concepts, shown mounted on a carriage.
Figure 8:
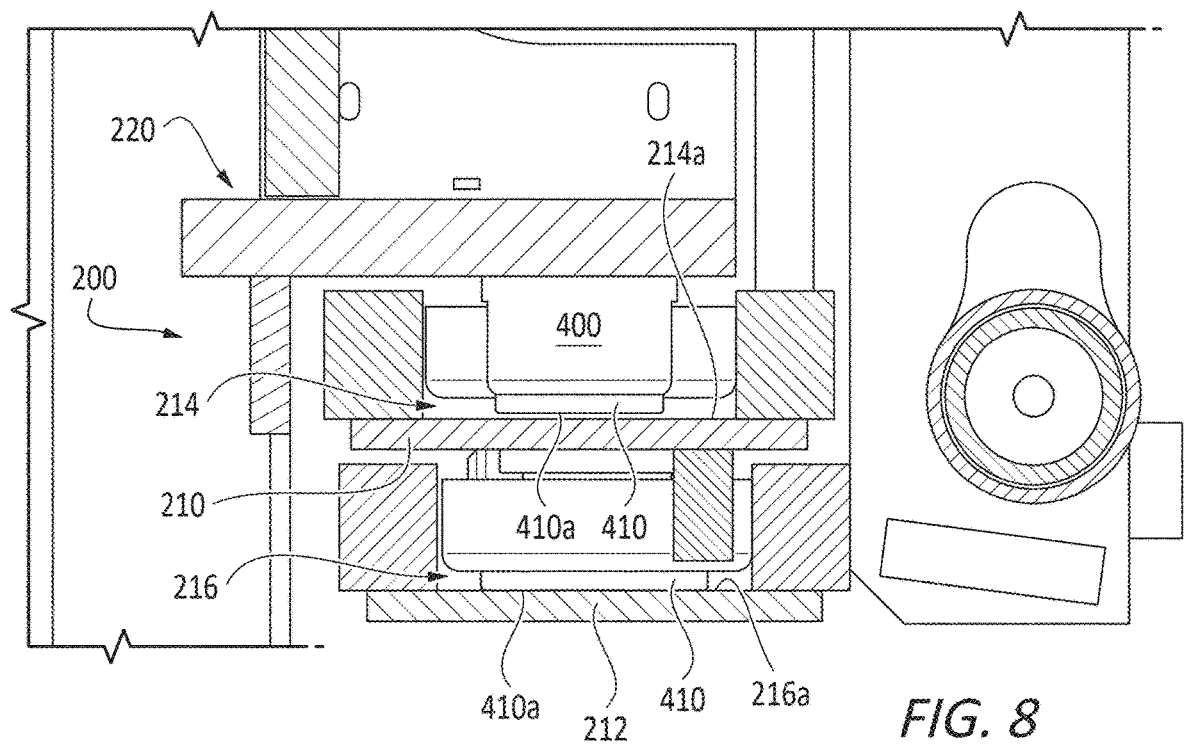
FIG. 8 is a cross-sectional top view of a mast system showing wear blocks and wear pads arranged on a carriage and mast rail in mast channels according to principles of the present inventive concepts.
Figure 9:
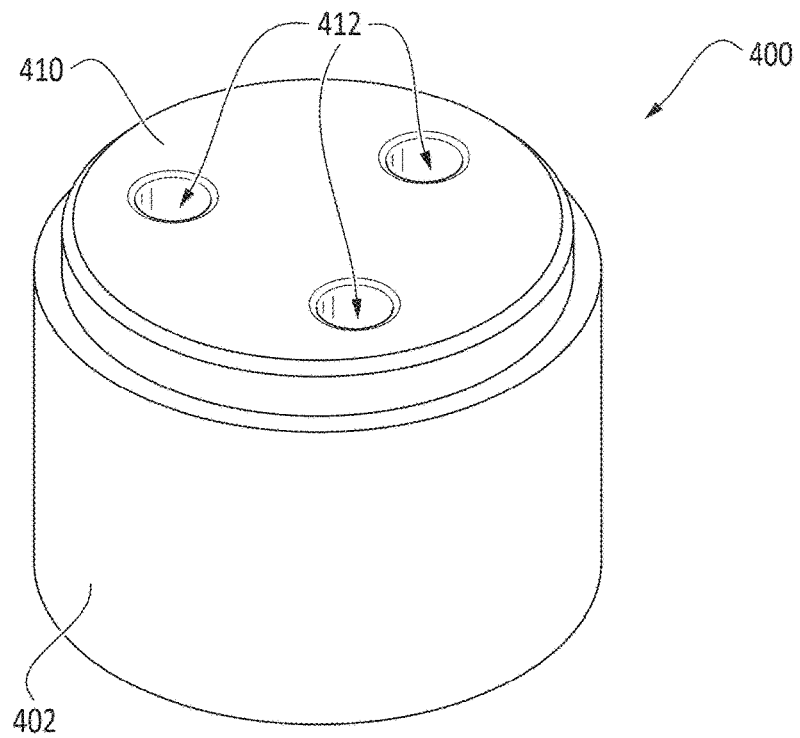
FIG. 9 is an isometric illustration of an adjustable wear block according to principles of the present inventive concepts.
Figure 10:
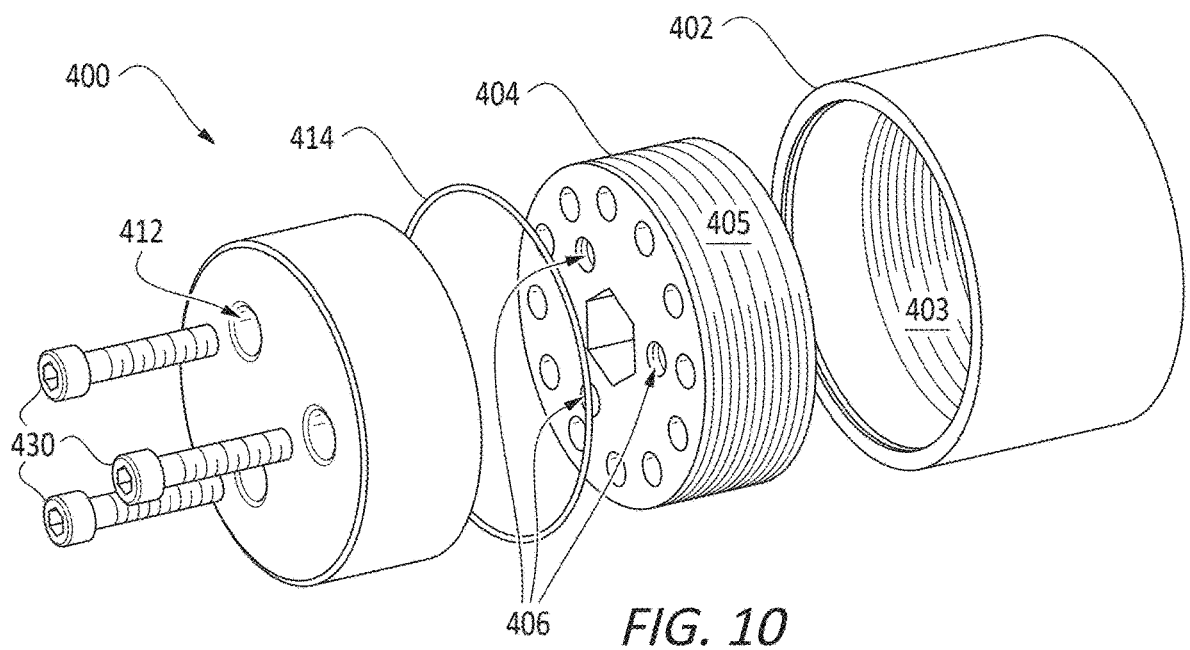
FIG. 10 is an exploded isometric illustration of the adjustable wear block of FIG. 9.
Figure 11:
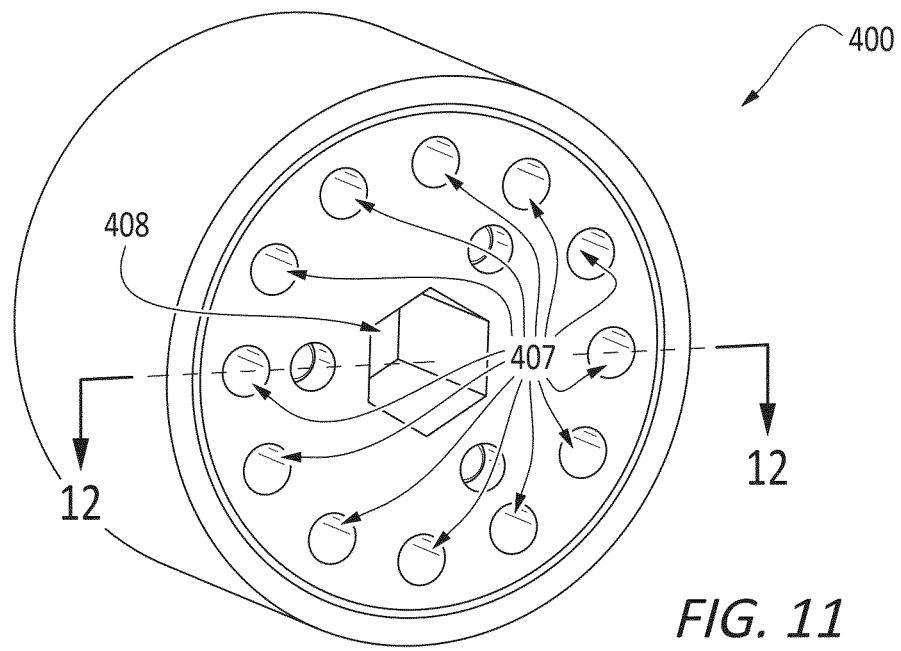
FIG. 11 is an isometric view of the housing and base of the adjustable wear block of FIG. 10.
Figure 12:
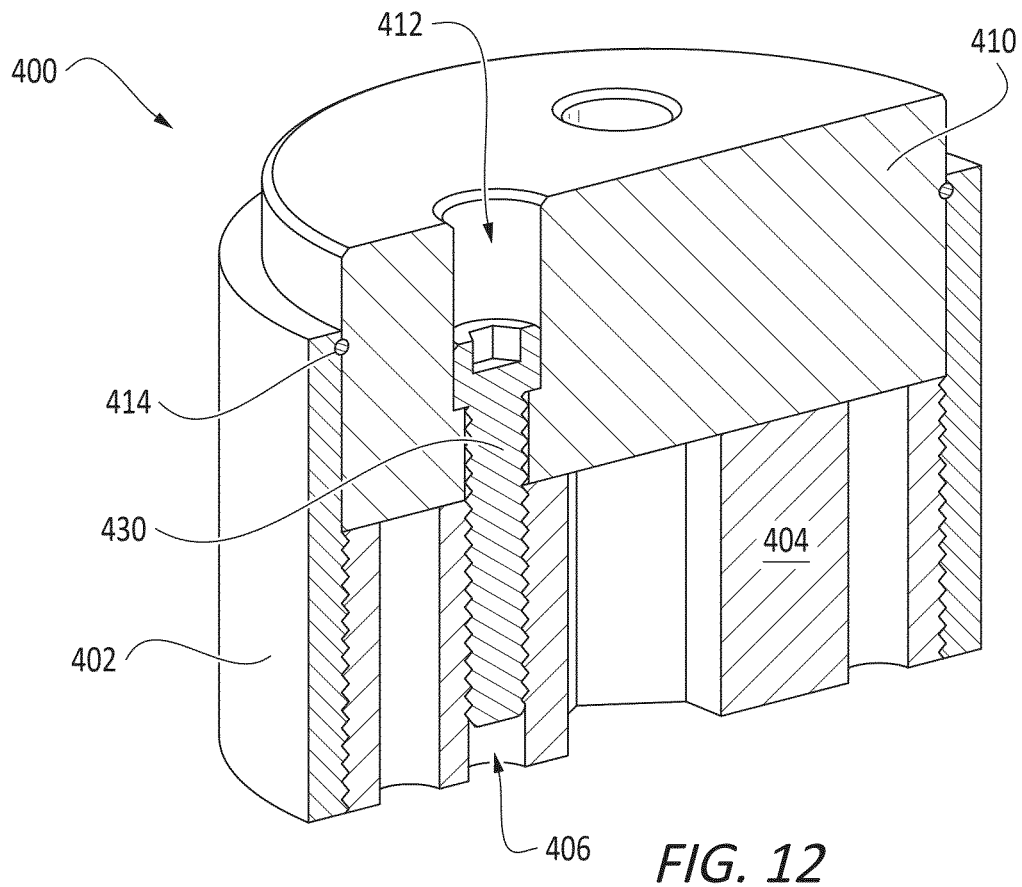
FIG. 12 is a cross-sectional isometric view of the adjustable wear block of FIG. 9.

FIG. 7 is an isometric view of a wear block 400 and wear pad 410 according to principles of the present inventive concepts, shown mounted on a carriage 220. FIG. 8 is a cross-sectional top view of a mast system 200 showing wear blocks 400 and wear pads 410 arranged on a carriage 220 and mast rail 210 in mast channels 214, 216 according to principles of the present inventive concepts. FIG. 9 is an isometric illustration of an adjustable wear block 400 according to principles of the present inventive concepts. FIG. 10 is an exploded isometric illustration of the adjustable wear block 400 of FIG. 9. FIG. 11 is an isometric view of the housing 402 and base 404 of the adjustable wear block 400 of FIG. 10. And FIG. 12 is a cross-sectional isometric view of the adjustable wear block 400 of FIG. 9.

Referring now to FIGS. 7-12, according to principles of the present inventive concepts, a wear block 400 is designed and mounted to a carriage 220 or mast rail 210 in a manner that permits the wear pad 410 height to be easily adjusted to position the wear surface 410a of the wear pad 410 at a proper distance (clearance) from the opposite channel wall 214a, 216a to absorb sideways forces and to prevent damage to mast components without interfering with lift operations.

More specifically, in one embodiment, an adjustable wear block 400 is provided having an easily adjustable wear surface 410a position (or wear pad height, a distance away from a surface). A circular housing 402 having internal threads 403 is attached to the carriage 220 so as to be arranged between the carriage 220 and a mast channel wall 214a when the carriage 220 is mounted in the mast system 200. The wear block housing 402 can be attached to the carriage 220 by welding, bolts, adhesive, or other mechanical or chemical connection. A threaded base 404 (formed of metal or other rigid material) having threads 405 matching the housing threads 403 is arranged in the housing 402 such that its position within the housing 402 can be adjusted by rotating the metal base 404 with respect to the housing 402. A wear pad 410 is attached to the base 404 using one or more fasteners, an adhesive, or other connection mechanism. In one embodiment, three threaded bolts 430 are secured through holes 412 in the wear pad 410 to mounting holes 406 in the base 404 to secure the wear pad 410 to the rotatable base 404. A hexagonal hole or other tool receptacle 408 can be arranged in or through a center of the base 404 to permit a tool (such as a hex wrench or other tool) 440 (see FIGS. 13E-13F) to be inserted therein to rotate the base 404 with respect to the housing 402.

The adjustable wear block 400 can be made to easily retrofit to existing lift trucks 100 such as by replicating a connection mechanism of the conventional wear block 300. For example, screw holes can be arranged in locations on the adjustable wear block that match the mounting screws on or through the carriage or mast mounting surface. Additional holes can be formed through the carriage or mast mounting wall to provide access to the locking holes and tool receptacle.

FIGS. 13A-13F are isometric and isometric cross-sectional views of the adjustable wear block 400 of FIG. 9 arranged on a wall 224 of a carriage 220, further illustrating a method for adjusting the adjustable wear block 400 according to principles of the present inventive concepts. Referring additionally to FIGS. 13A-13F, a tool receptacle hole 224a can be arranged through the mounting wall 224 of the carriage 220 or mast rail 210 to permit easy adjustment of the wear pad 410 height using a tool 440, without the need to remove the carriage 220 or other mast system 200 components. One or more locking holes 407 (preferably a series or pattern of locking holes 407) can be provided in the bottom of the base 404 to receive one or more locking screws or pins 432 that prevent rotation of the base 404 when the locking screws 432 are inserted through a mounting wall 224 into the locking holes 407. The locking holes 407 can, for instance, be arranged in a circular pattern near an outside edge of the base 404 to permit the base 404 to be locked in any of numerous different rotational positions. The locking screws 432 can, for instance, be threaded bolts that are threaded into the threaded locking holes 407. Matching holes 224b can be arranged through the carriage or mast sidewall 224 to which the wear block 410 is attached to receive the locking screws or pins 432. A plug or cap 436 may be used to cover the tool receptacle hole 224a in the carriage or mast wall 224 before and after adjustment of the wear pad 410 height to prevent moisture or other contaminants from entering the wear block 400. An O-ring 414 (illustrated in FIGS. 10 and 12) can also be provided between the wear pad 410 and the housing 402 to keep moisture and other contaminants from getting into the housing 402.

Figure 13A:
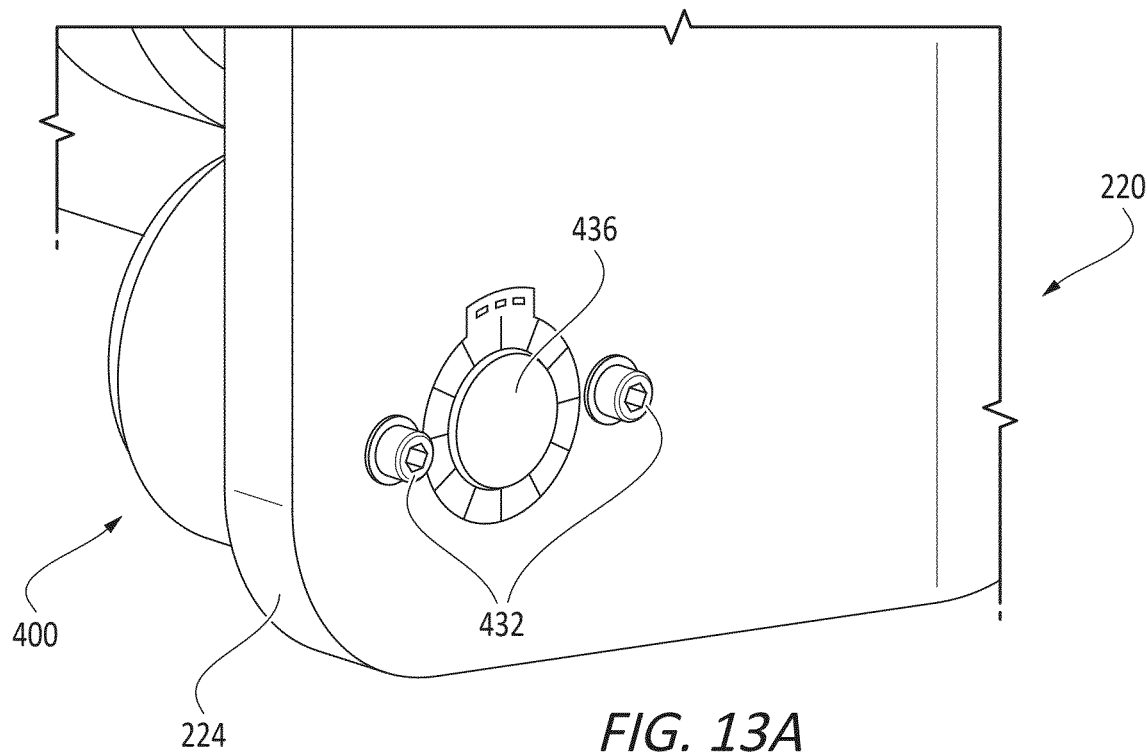
FIGS. 13A-13F are isometric and isometric cross-sectional views of the adjustable wear block of FIG. 9 arranged on a carriage, further illustrating a method for adjusting the adjustable wear pad according to principles of the present inventive concepts.
Figure 13B:
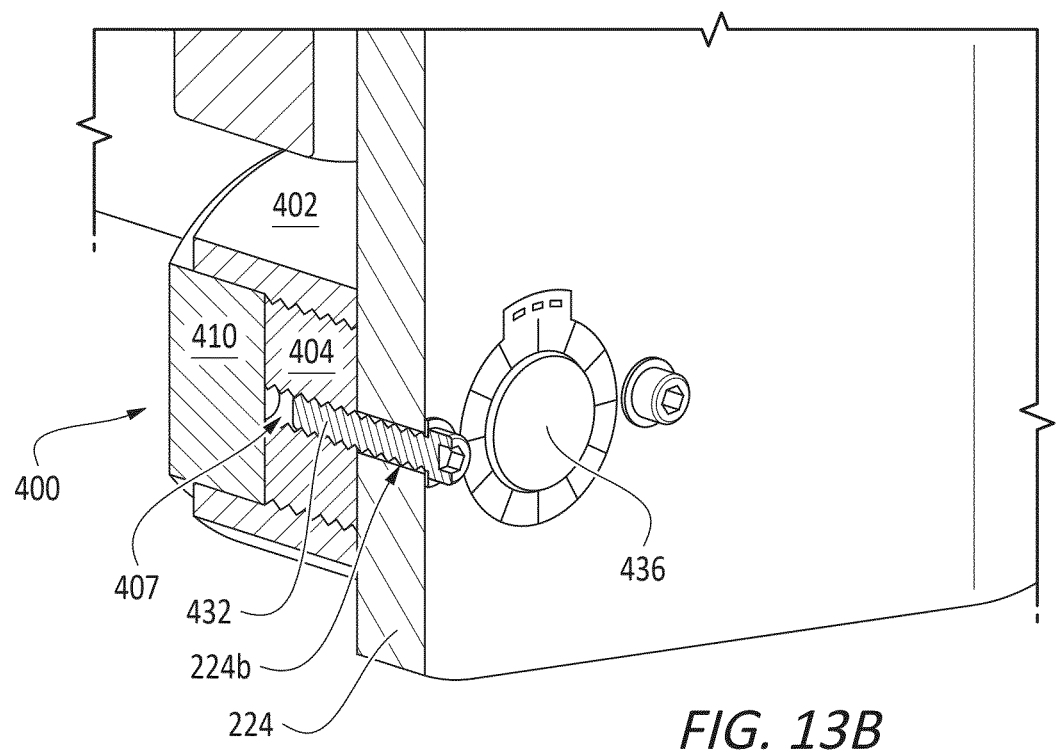
Figure 13C:
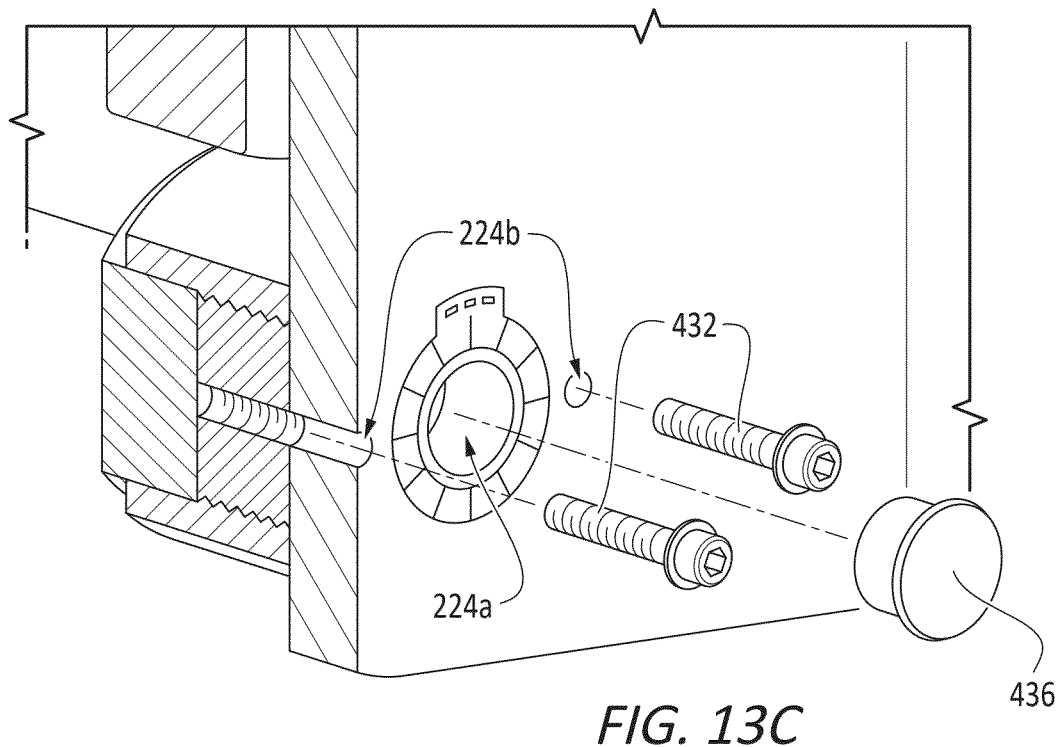
Figure 13D:
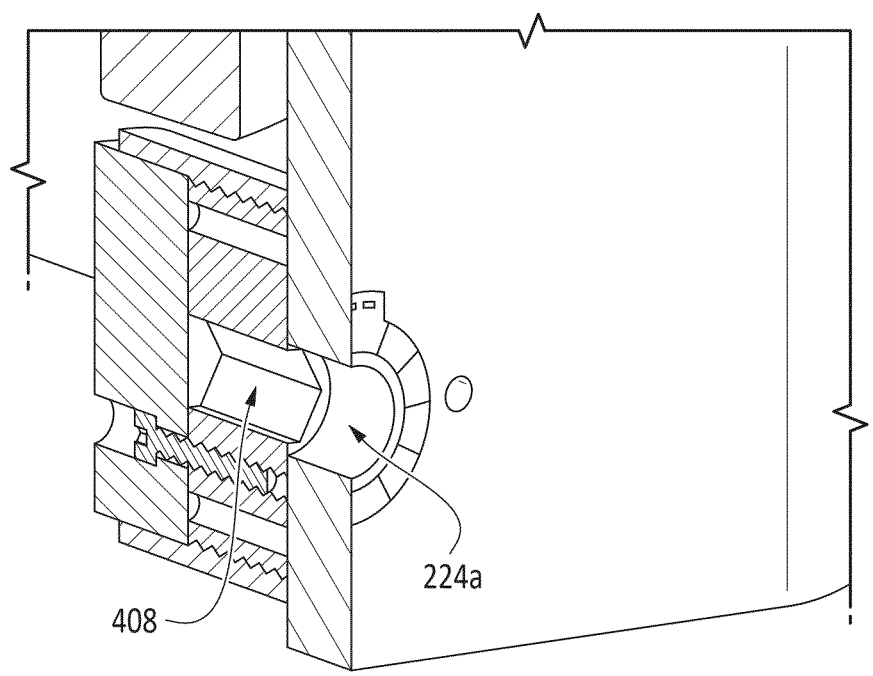
Figure 13E:
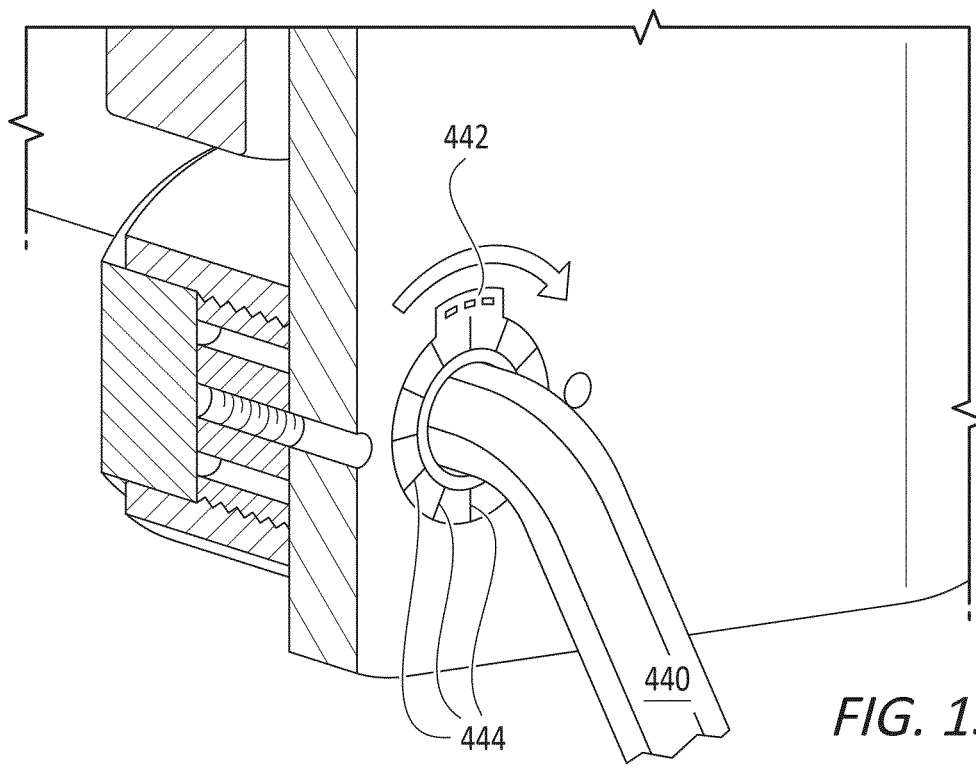
Figure 13F:
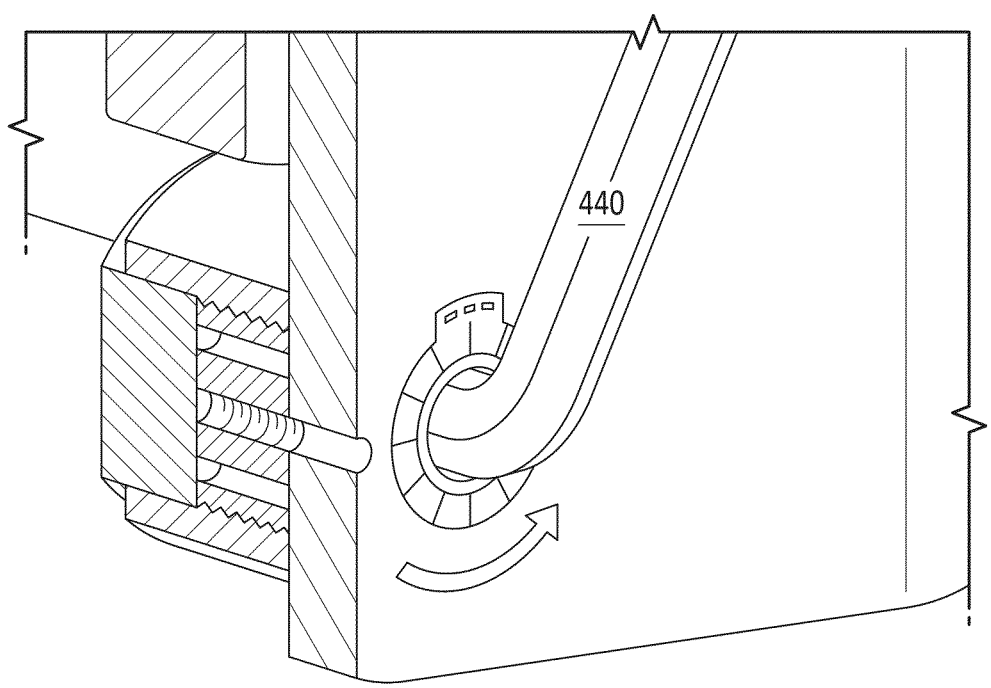

In one embodiment, to adjust the wear pad 410 height, the locking screws 432 and cap 436 are removed from the wall 224, releasing the wear block base 404 and permitting access to the tool receptacle 408. A tool 440 is inserted through hole 224a into the tool receptacle 408 in the base 404, and the base 404 is rotated to adjust the height of the wear pad 410. As the base 404 is rotated, the wear pad 410 is either extended further from or retracted into the housing 402 depending on the direction of rotation of the base 404. A clearance of the wear pad 410 can be set to a desired distance by first adjusting the wear pad 410 to a height where the wear surface 410a contacts the mast channel wall 214a, 216a (by rotating the tool clockwise as indicated in FIG. 13E) and then rotating the base 404 backwards (by rotating the tool counterclockwise as indicated in FIG. 13F) by some amount (e.g., two full rotations of the adjustment tool 440 (and therefore the base 404)). A sticker 442 or other markings can be placed around the hole 224a for the adjustment tool 440 with divisions 444 indicating a relationship between the rotation of the tool 440 and the height adjustment (or linear travel distance) of the wear pad 410. In one embodiment, the base threads 405 and housing threads 403 each have a 6 mm thread pitch and each segment 444 on the sticker 442 can represent 0.5 mm of linear travel of the wear pad 410.

Of course, alternative embodiments are also contemplated and are within the scope of the present inventive concepts. For example, the wear block housing need not be circular so long as it provides an adjustable wear pad surface height that can be adjusted from a convenient location, such as a back side of the wear block through a mounting wall. For example, a rectangular wear block housing could be used with a wear pad mounted on an adjustable base whose height can be extended and retracted using one or more screws mounted through one or more holes on the base. In addition, a tool receptacle need not be provided in the base so long as a mechanism for adjusting the wear pad height is provided in a convenient location, such as on an opposite side of the carriage or mast wall. In one alternative, a knob, bolt, rod, stem, or other mechanism can be connected directly to the base and extend through a hole in the carriage or mast wall to permit rotation of the base without requiring a separate tool, or it may permit a tool to adjust an end of the knob, bolt, rod, stem, or other mechanism without requiring the tool to extend into and/or through a receptacle of the wall or base.

Figure 14:
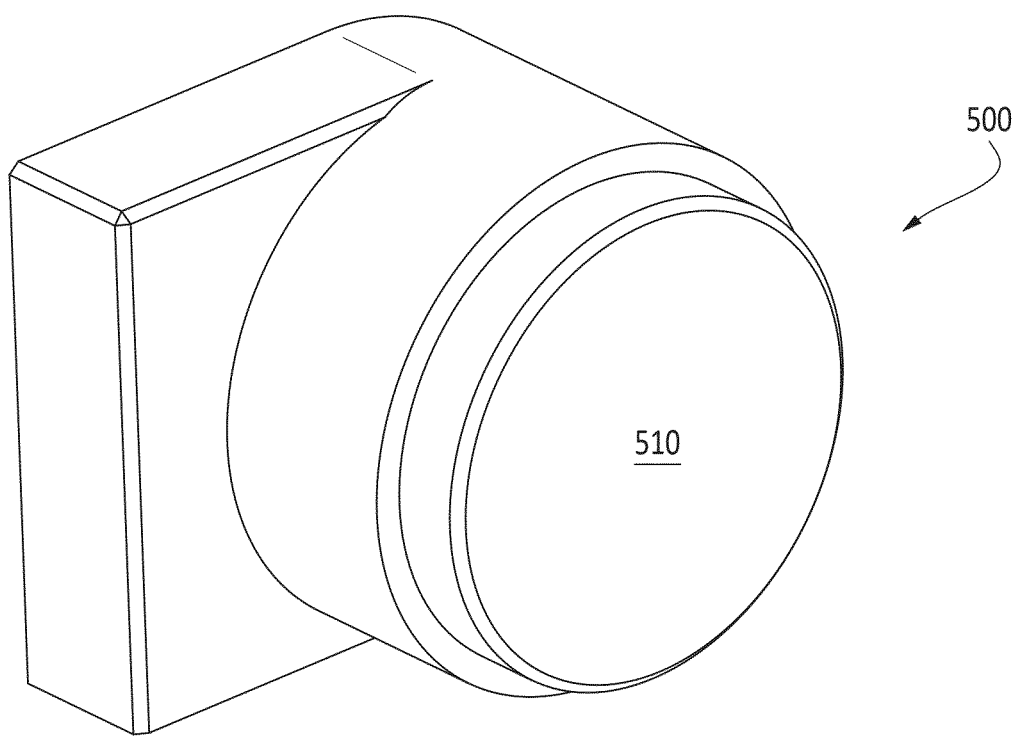
FIG. 14 is an isometric view of a hydraulic adjustable wear block according to another embodiment of principles of the present inventive concepts.
Figure 15:
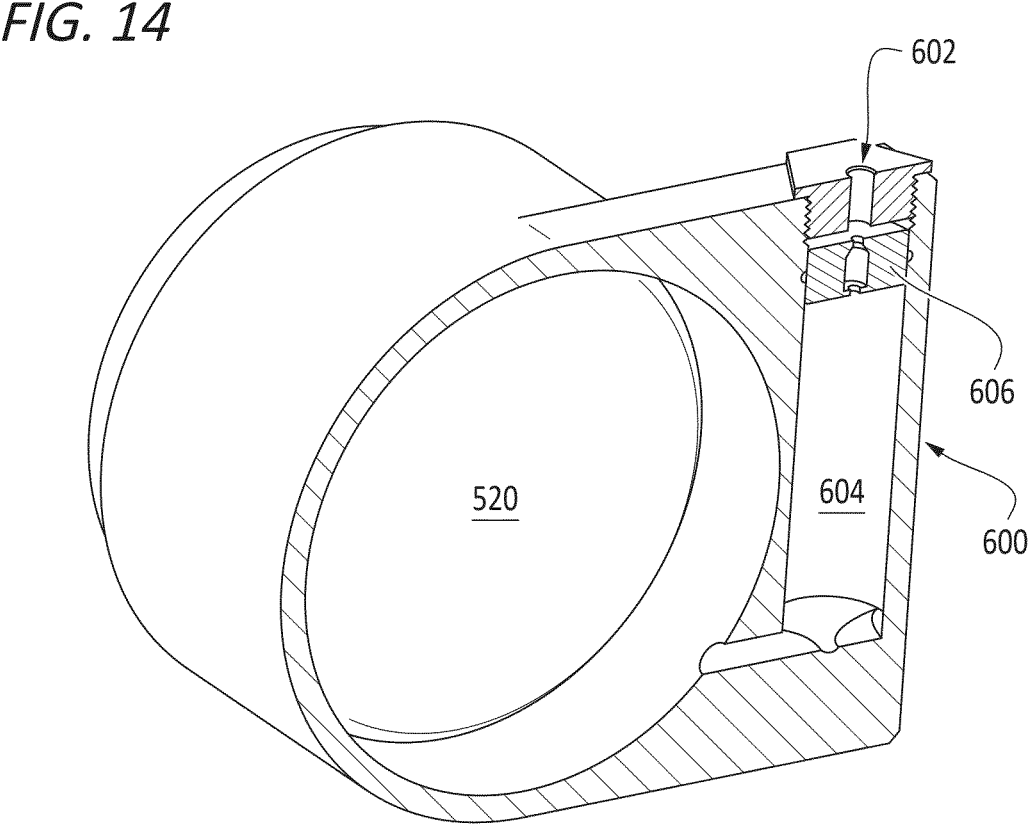
FIG. 15 is a cross-sectional isometric view of the hydraulic adjustable wear block of FIG. 14.

FIG. 14 is an isometric view of a hydraulic adjustable wear block 500 according to another embodiment of principles of the present inventive concepts. FIG. 15 is a cross-sectional view of the hydraulic adjustable wear block 500 of FIG. 14. FIGS. 16A-16E are schematic illustrations of the hydraulic adjustable wear block 500, illustrating a method of operating the hydraulic adjustable wear block 500 according to further principles of the present inventive concepts.

Referring now to FIGS. 14-16E, in another embodiment, the height of a wear pad 510 can be hydraulically adjusted to maintain a desired clearance with the mast channel wall 214a. In one embodiment, a wear pad 510 is arranged on a hydraulic piston 520 within a wear block 500. The wear pad 510 and hydraulic piston 520 can, for example, be the same size and shape in cross-section, or the hydraulic piston 520 can be arranged to push a base plate or wear pad of any other desired shape. In some embodiments, the wear pad 510 itself may be the hydraulic piston 520.

A hydraulic fluid valving system 600 may be provided that ensures that the wear pad 510 is arranged with the desired clearance C from the mast channel wall 214a. An oil feed 602 can be provided to feed oil (or other suitable hydraulic fluid) into the hydraulic cylinder 610 behind the hydraulic piston 520 that drives the wear pad 510. The oil feed 602 is preferably supplied through a first cylinder 604 having a piston 606 arranged therein that can slide forward and backward throughout the length of the first cylinder 604. The first cylinder 604 can have a fluid volume defined such that one stroke of the piston 606 corresponds to a predetermined linear travel distance of the wear pad 510. The predetermined linear travel distance can, for example, be approximately about 2 mm. A check valve 608 can be arranged through the piston 606 so that oil is supplied through the piston 606 into the hydraulic cylinder 610 once the piston 606 travels fully forward within the first cylinder 604. The check valve 608 can include a preload spring 609 that requires a predetermined force (pressure) before opening. The predetermined pressure can, for instance, be approximately about 1 bar. The check valve 608 prevents oil from returning back into the oil feed 602.

Figure 16A:
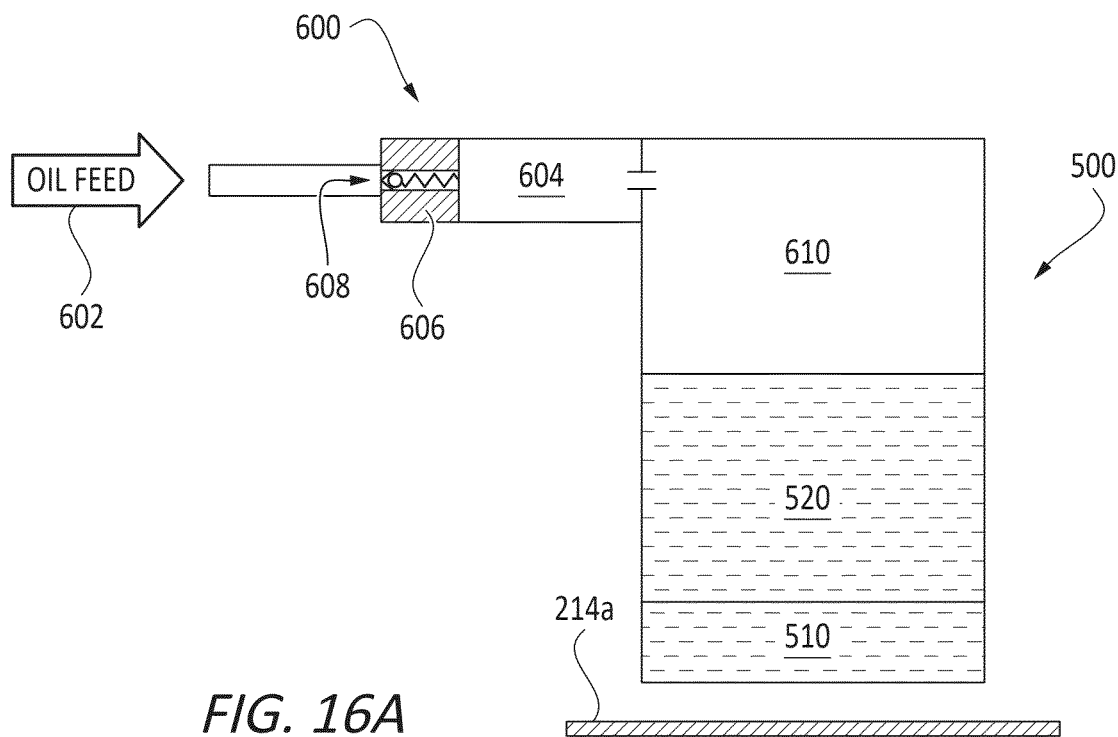
FIGS. 16A-16E are schematic illustrations of a hydraulic adjustable wear block, such as that of FIG. 14, illustrating a method of operating the hydraulic adjustable wear block according to further principles of the present inventive concepts.
Figure 16B:
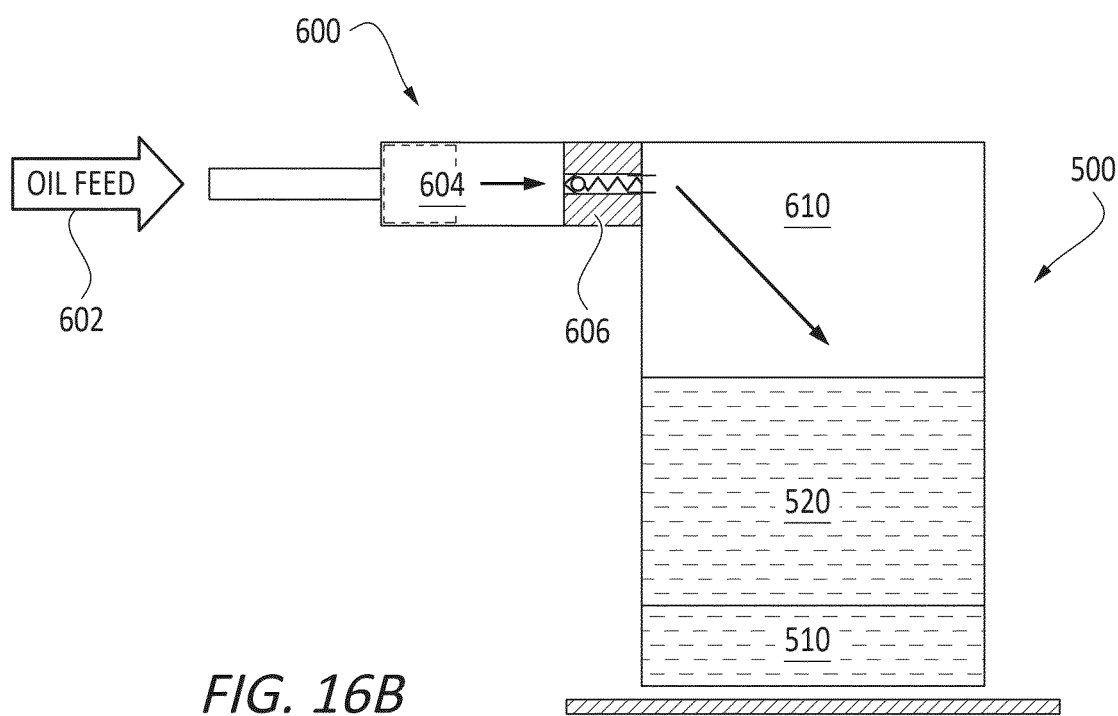
Figure 16C:
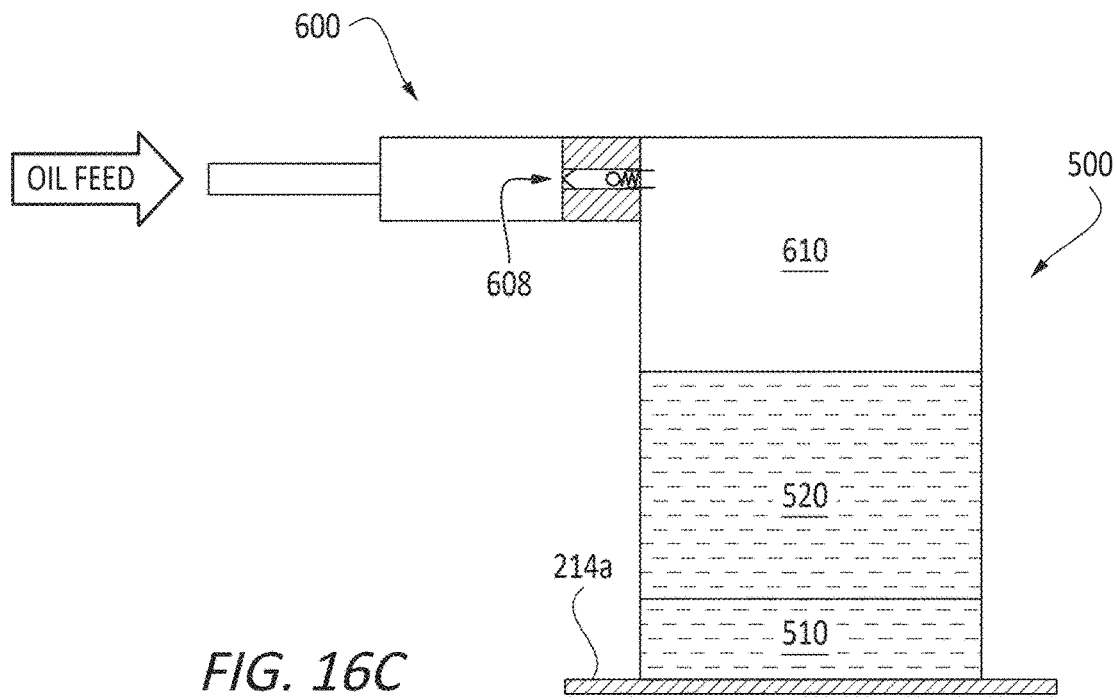
Figure 16D:
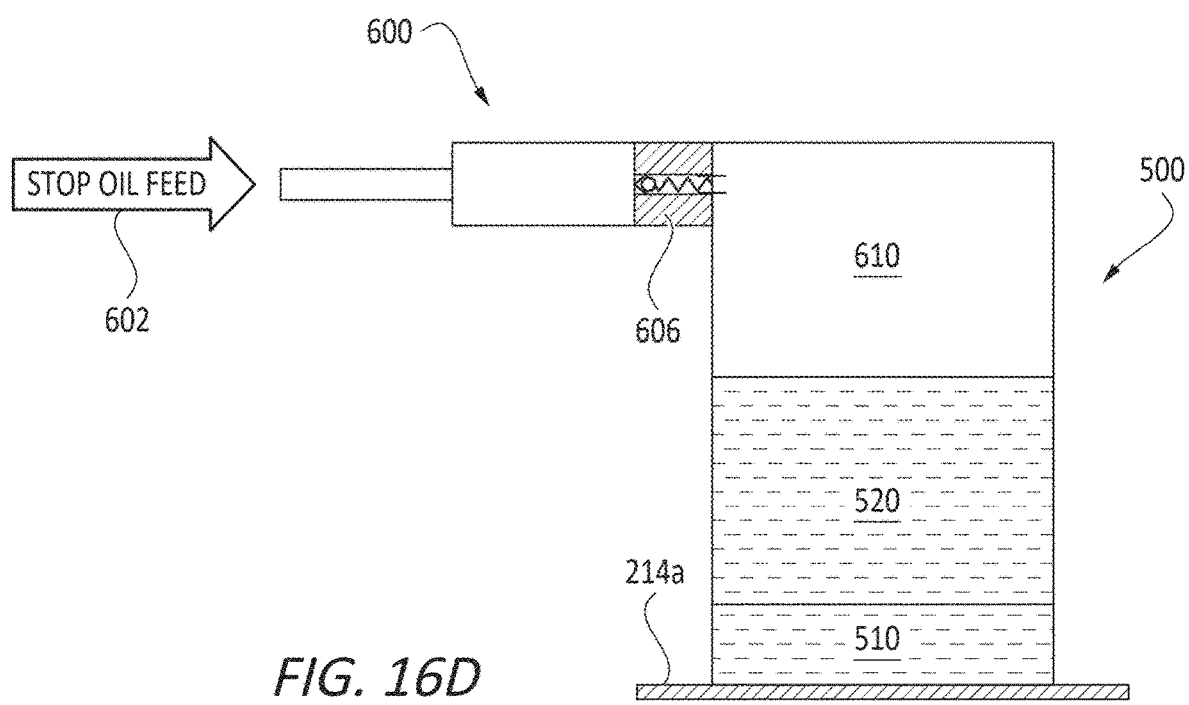
Figure 16E:
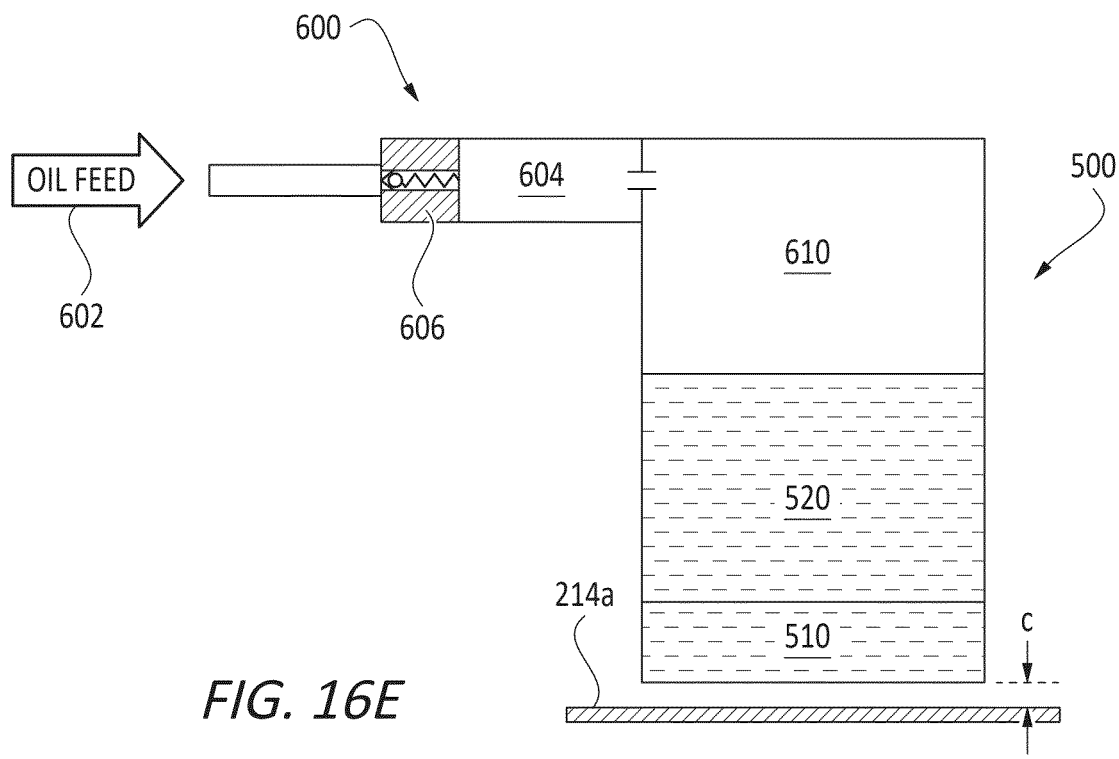

In operation, oil is supplied from the oil feed 602 to the first piston 606 in the first cylinder 604. The piston 606 is driven forward through the first cylinder 604 until it reaches the end of the first cylinder 604. As the piston 606 travels forward, it drives the fluid from the first cylinder 604 into the hydraulic cylinder 610 behind the piston 520. As the fluid enters the hydraulic cylinder 610, it forces the piston 520 and wear pad 510 outward. Since the first cylinder 604 volume is defined such that full movement of the piston 606 equals 2 mm (or other predetermined amount) linear movement of the wear pad 510, the wear pad 510 will be forced to move a linear distance of 2 mm by the movement of the piston 606 or until it contacts the mast channel wall 214a. If, after the piston 606 travels its full distance, there is still clearance between the wear pad 510 and the channel wall 214a, the check valve 608 will open and permit additional oil to be supplied through the check valve 608 into the hydraulic cylinder 610, causing the wear pad 510 to continue to move until it makes contact with the mast channel wall 214a. Once the wear pad 510 contacts the mast channel wall 214a, the hydraulic piston 520 cannot move any further and the hydraulic cylinder 610 cannot receive any more oil. When the cylinder 610 cannot receive any more oil, the oil feed 602 then stops or is stopped. With the oil feed 602 stopped, the piston 606 in the first cylinder 604 is then free to move back to its original position (as shown in FIG. 16E) as force is applied to wear pad 510. As forces from the mast system 200 act on the wear pad 510, the wear pad 510 pushes fluid from the hydraulic cylinder 610 back into the first cylinder 604, driving the piston 606 back towards its original position. And because the first cylinder 604 volume corresponds to a 2 mm linear travel distance of the wear pad 510, the wear pad 510 can be forced back by up to 2 mm before the piston 606 reaches its original position and further movement of the wear pad 510 is prevented. In this manner, the clearance C can be set to a predetermined distance by selecting a desired fluid volume for the first cylinder 604.

Figure 17:
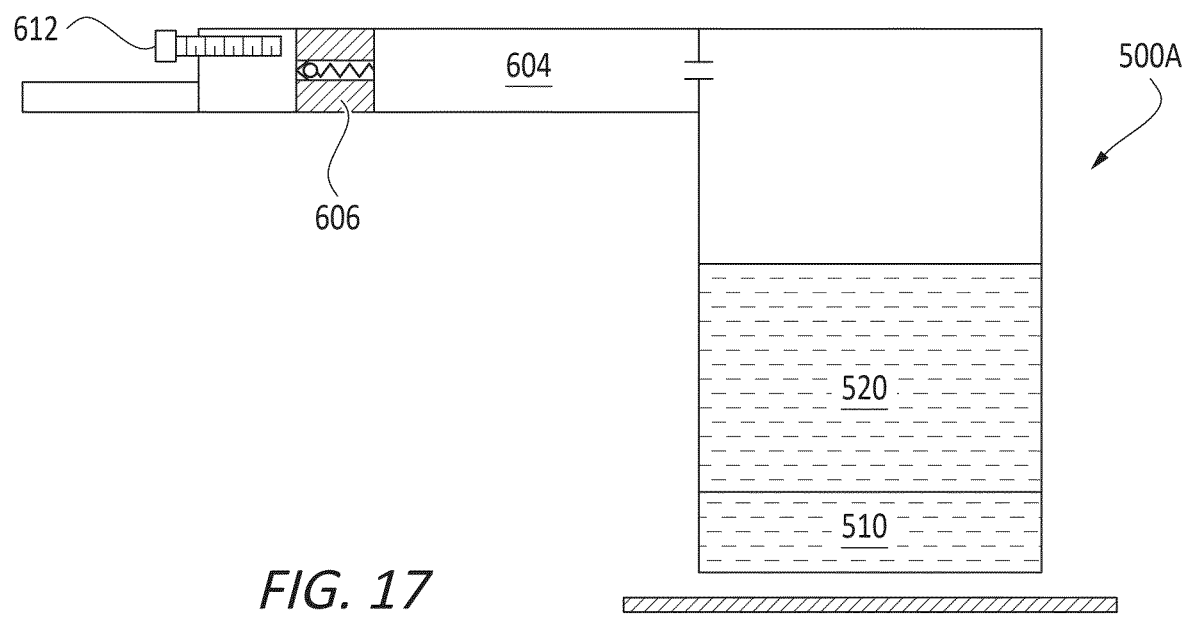
FIG. 17 is a schematic illustration of a hydraulic adjustable wear block according to yet another embodiment of the present inventive concepts.
Figure 18:
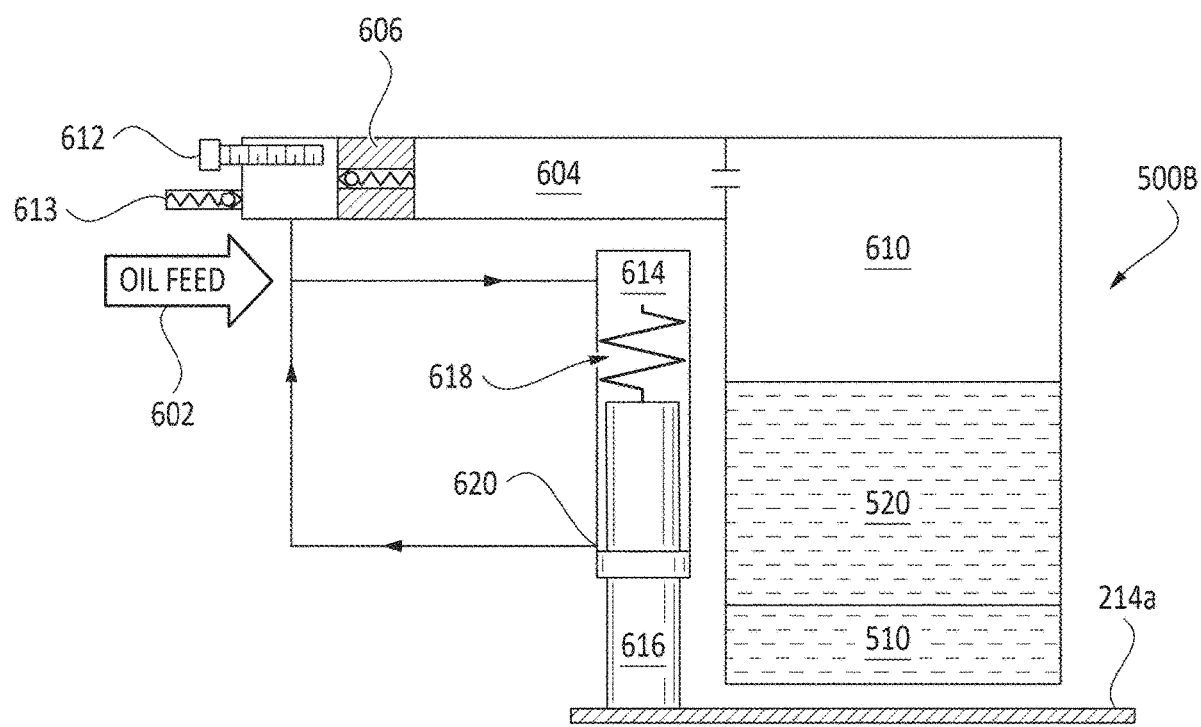
FIG. 18 is a schematic illustration of a hydraulic adjustable wear block according to a still further embodiment of the present inventive concepts.
Figure 19:
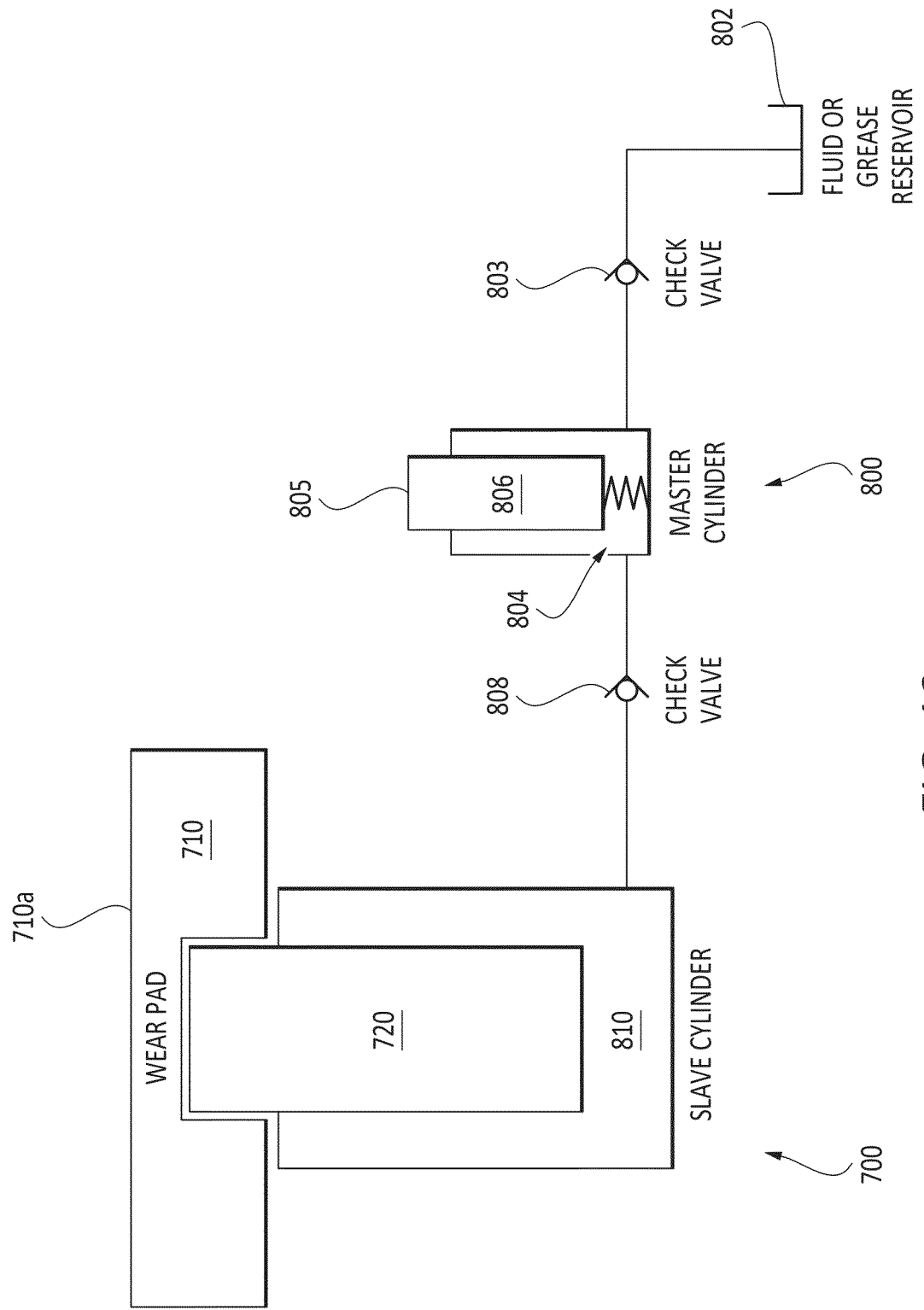
FIG. 19 is a schematic illustration of an automatically adjusting wear block according to another embodiment of the present inventive concepts.

FIG. 17 is a schematic illustration of a hydraulic adjustable wear block 500A according to yet another embodiment of the present inventive concepts. FIG. 18 is a schematic illustration of a hydraulic adjustable wear block 500B according to a still further embodiment of the present inventive concepts. FIG. 19 is a schematic illustration of an automatically adjusting wear block 700 according to another embodiment of the present inventive concepts.

In other embodiments of the hydraulic adjustable wear block 500A, 500B according to further aspects of the present inventive concepts, the amount of clearance C can be made adjustable by providing extra volume in the first cylinder 604. Referring now additionally to FIGS. 17-18, the first cylinder 604 can be provided with additional volume and an adjusting screw 612 or other travel limiter to set the travel distance of the first piston 606 and therefore the corresponding linear travel distance of the wear pad 510. By adjusting the piston 606 travel distance and therefore the permitted linear travel distance of the wear pad 510, the clearance C can be adjusted and set as desired.

Referring specifically to FIG. 18, in one embodiment of the hydraulic adjustable wear block 500C, a second piston (centering piston) 616 can be provided that acts as or controls a valve 620 to control when the oil is supplied to the hydraulic cylinder 610, such as when a mast 210 is centered. The second piston 616 can be arranged in a second cylinder 614 with a retraction spring 618 biasing it toward a closed valve position. The oil feed 602 can be selectively supplied to the first cylinder 604 through the second cylinder 614 only when the second piston 616 opens the valve 620. When the mast 210 is centered, the second piston 616 can open the valve 620 to permit oil to flow into the first cylinder 604. In this manner, the wear pad 510 position is set when the mast 210 is centered. A dump (or dump valve) 613 can be provided from a first end of the first cylinder 604 (opposite the hydraulic cylinder 610) to permit the release of oil from the first end of the first cylinder 604. This one-way dump valve 613 permits the first piston 606 to move backwards until it contacts the set screw 612.

Figure 20:
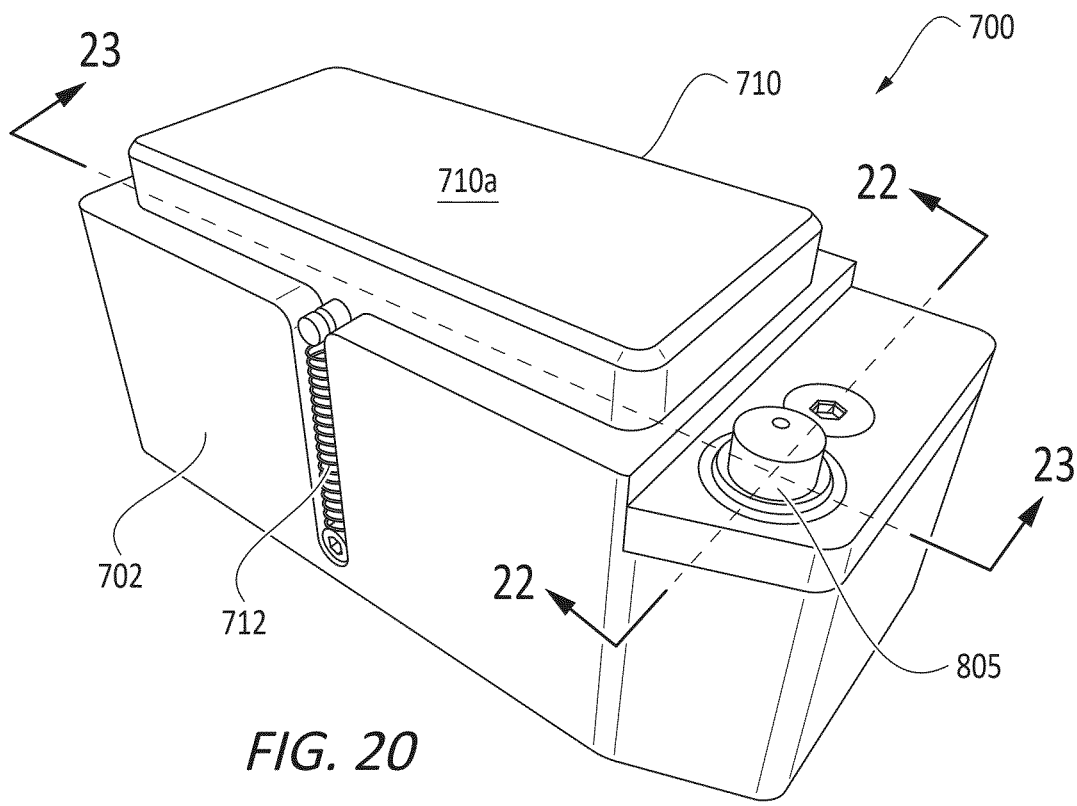
FIG. 20 is an isometric illustration of an automatically adjusting wear block according to principles of the present inventive concepts.
Figure 21:
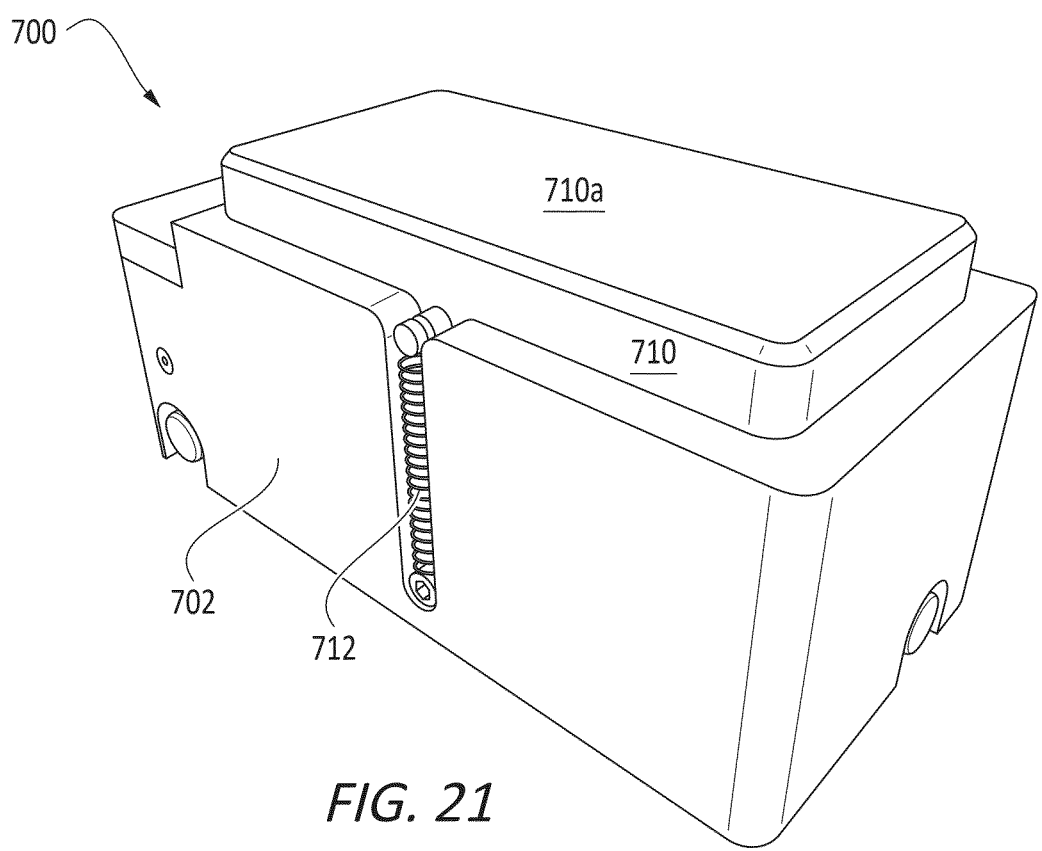
FIG. 21 is another isometric illustration of the automatically adjusting wear block of FIG. 20, rotated 180 degrees compared to FIG. 20.
Figure 22:
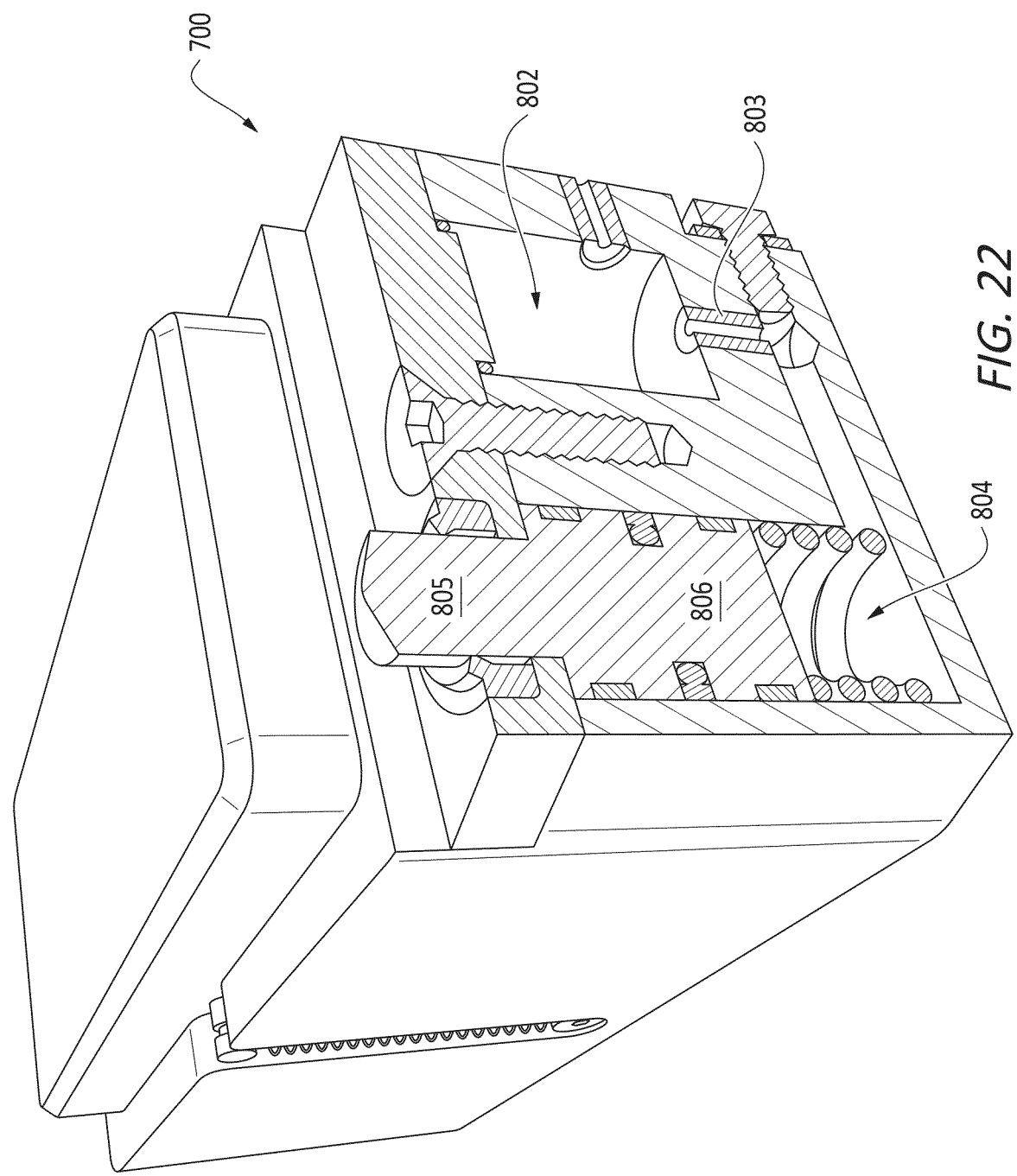
FIG. 22 is a cross-sectional isometric illustration of the automatically adjusting wear block of FIG. 20, taken along line 22-22 of FIG. 20.
Figure 23:
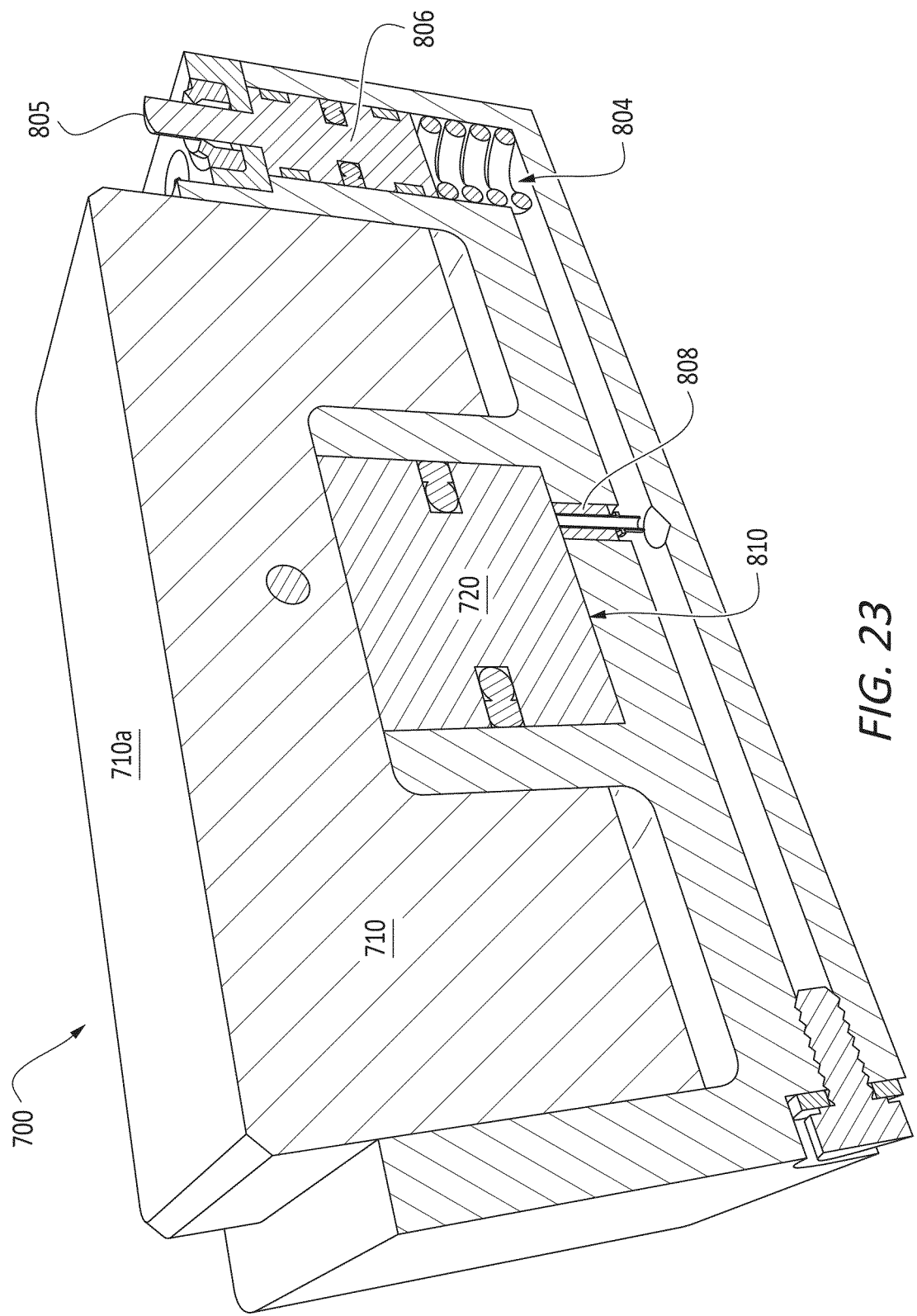
FIG. 23 is another cross-sectional isometric illustration of the automatically adjusting wear block of FIG. 20, taken along line 23-23 of FIG. 20.
Figure 24A:
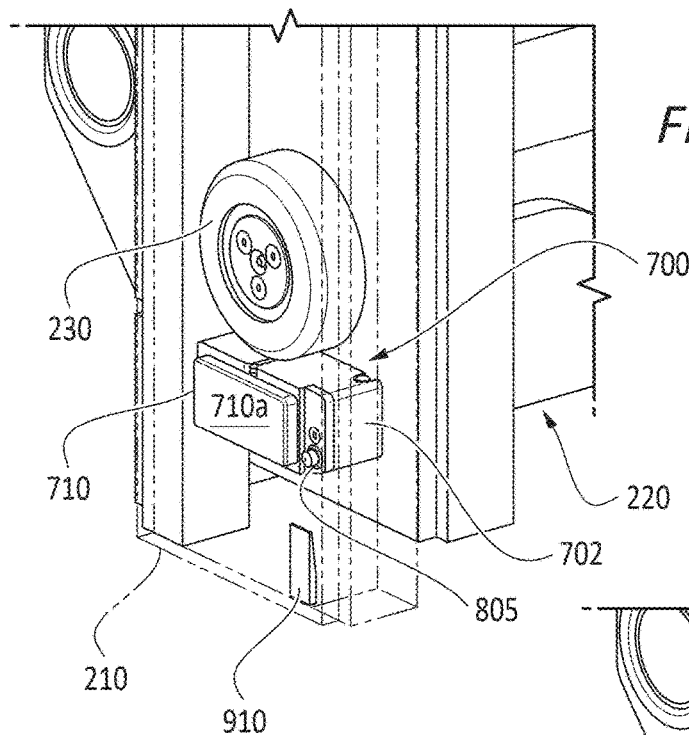
FIGS. 24A-24C are isometric illustrations of the automatically adjusting wear block of FIG. 20 mounted to a carriage and a ramp arranged in a mast channel, further illustrating a method of operating the automatically adjusting wear block according to additional principles of the present inventive concepts.
Figure 24B:
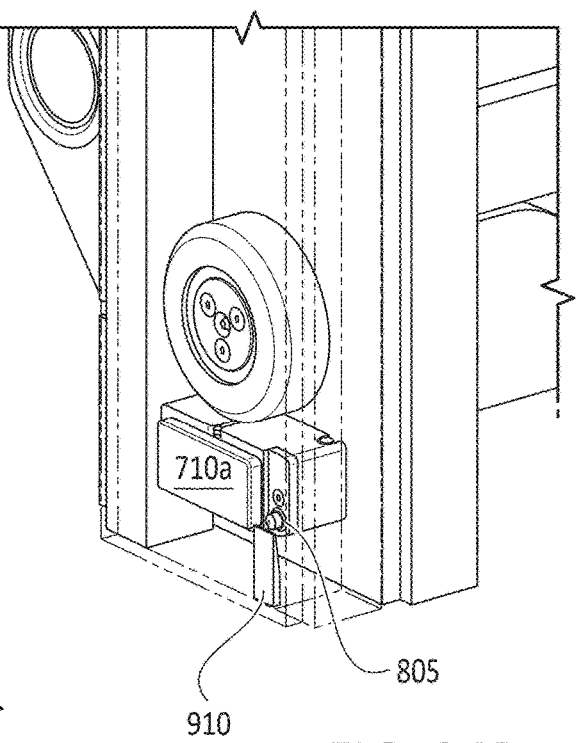
Figure 24C:
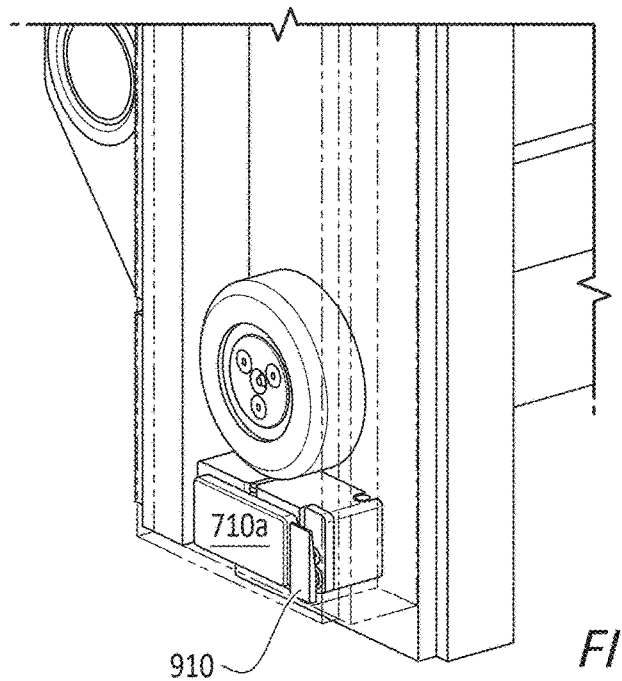
Figure 25A:
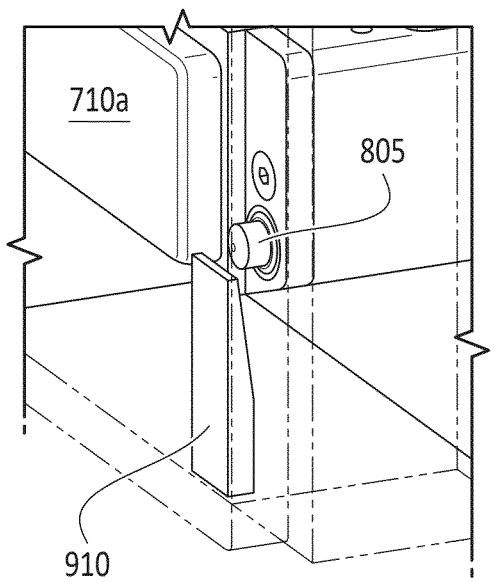
FIGS. 25A and 25B are close-up isometric illustrations of the automatically adjusting wear block of FIG. 20, further illustrating an interaction between a ramp arranged in a mast channel and the automatically adjusting wear block according to principles of the present inventive concepts.
Figure 25B:
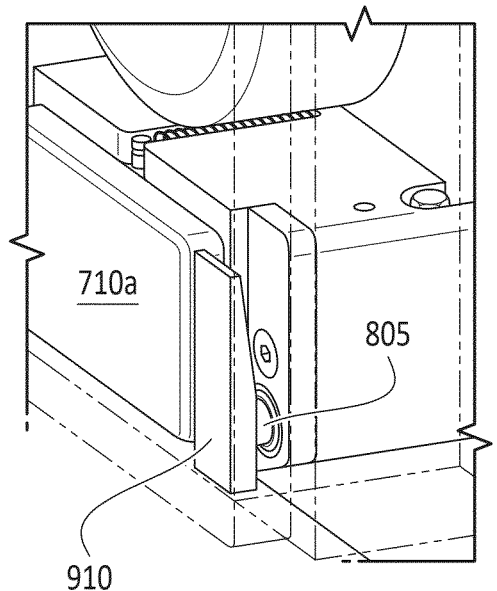
Figure 26:
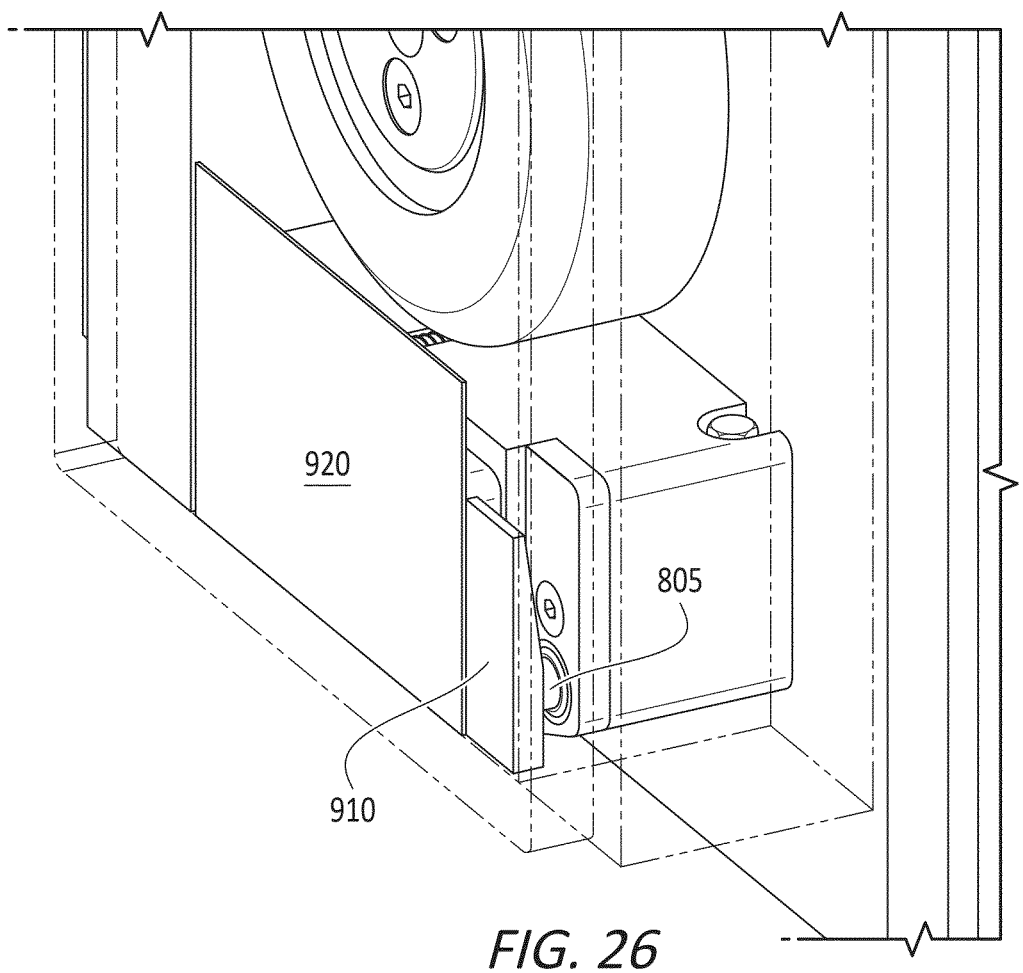
FIG. 26 is a close-up view similar to FIG. 25B, further illustrating the use of a shim plate to maintain a proper clearance distance when using the automatically adjusting wear block of FIG. 20.

FIG. 19 is a schematic illustration of an automatically adjusting wear block 700 according to another embodiment of the present inventive concepts. FIG. 20 is an isometric illustration of the automatically adjusting wear block 700 according to additional principles of the present inventive concepts. FIG. 21 is another isometric illustration of the automatically adjusting wear block 700 of FIG. 20. FIG. 22 is a cross-sectional isometric illustration of the automatically adjusting wear block 700 of FIG. 20. FIG. 23 is another cross-sectional isometric illustration of the automatically adjusting wear block 700 of FIG. 20. FIGS. 24A-24C are isometric illustrations of the automatically adjusting wear block 700 of FIG. 20 mounted to a carriage 220 and a ramp 910 arranged in a mast channel 214, further illustrating a method of operating the automatically adjusting wear block 700 according to additional principles of the present inventive concepts. FIGS. 25A and 25B are close-up isometric illustrations of the automatically adjusting wear block 700, further illustrating an interaction between a ramp 910 arranged in a mast channel 214 and the automatically adjusting wear block 700 according to principles of the present inventive concepts. FIG. 26 is a close-up view similar to FIG. 25B, further illustrating the use of a shim plate 920 to maintain a proper clearance distance when using the automatically adjusting wear block 700 of FIG. 20.

Referring now additionally to FIGS. 19-26, according to still further principles of the present inventive concepts, an automatically adjusting wear block 700 can be provided that automatically adjusts a height of the wear pad 710 to provide a desired clearance with the mast channel wall 214*a* at a predetermined travel point of the mast system 200. In one embodiment, an automatically adjusting wear block 700 can include a wear block housing 702, a wear pad 710 arranged in the housing 702, and a hydraulic system 800 for adjusting the height of the wear pad 710. A button 805 can be arranged on the wear block housing 702 beside the wear pad 710 to force the wear pad 710 outward when depressed. A ramp 910 can be provided along the mast channel 214, 216 to activate the button 805 when the carriage/mast 220/210 reaches a certain desired adjustment point along its travel.

In one embodiment, a hydraulic piston 806 in a master cylinder 804 is connected to a button 805. A ramp 910 in the mast channel 214, 216 is configured to contact the button 805 at the desired adjustment point during carriage/mast 220/210 travel. When the ramp 910 contacts the button 805, the button 805 is depressed and the connected hydraulic piston 806 forces hydraulic fluid from the master cylinder 804 into a slave cylinder 810, driving a second hydraulic piston 720 that forces the wear pad 710 outward. Retention springs 712 can be provided between the wear block housing 702 and wear pad 710 to keep the wear pad 710 inside the wear block housing 702. A shim plate 920 can be provided in the mast channel 214, 216 at the adjustment point in the carriage/mast 220/210 travel to ensure that the wear pad surface 710*a* extends only to the shim plate 920. This keeps the appropriate clearance between the upper surface 710*a* of the wear pad 710 and the mast channel wall 214*a*. Alternatively, one or more methods and mechanisms similar to that described with respect to FIGS. 16A-18 can be used to automatically set a proper clearance distance. Check valves 803, 808 can be provided between the fluid reservoir 802 and the master cylinder 804 and between the master cylinder 804 and the slave cylinder 810 to ensure that the hydraulic fluid only flows in one direction.

Figure 27:
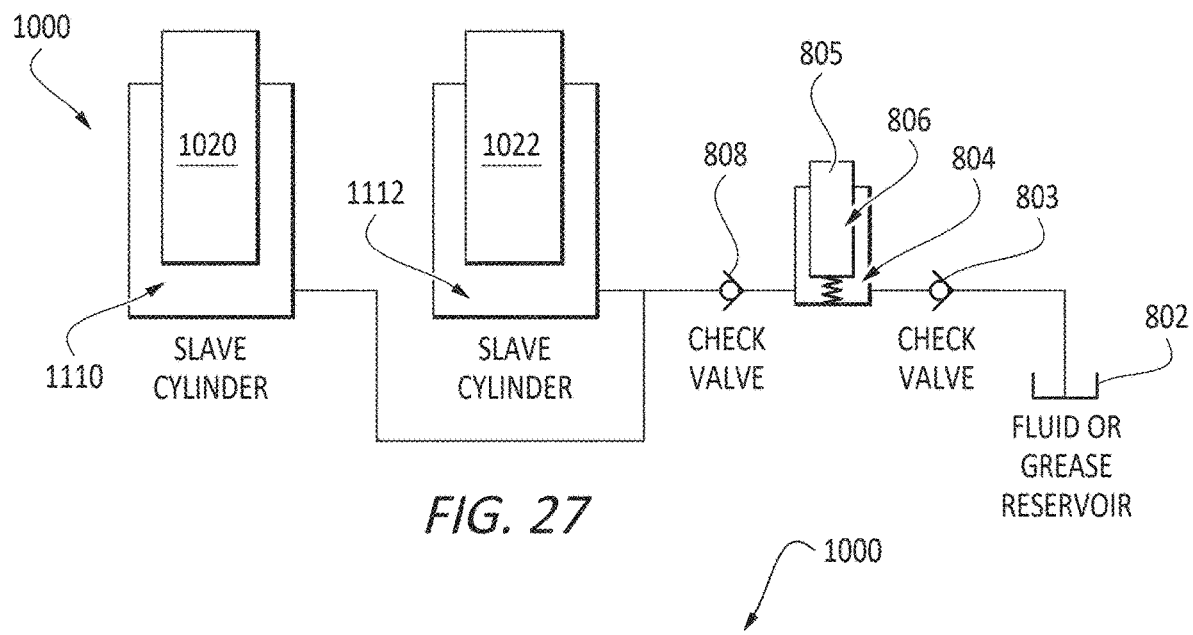
FIG. 27 is a schematic illustration of an automatically adjusting wear block that further automatically aligns with a channel surface according to still other principles of the present inventive concepts.
Figure 28A:
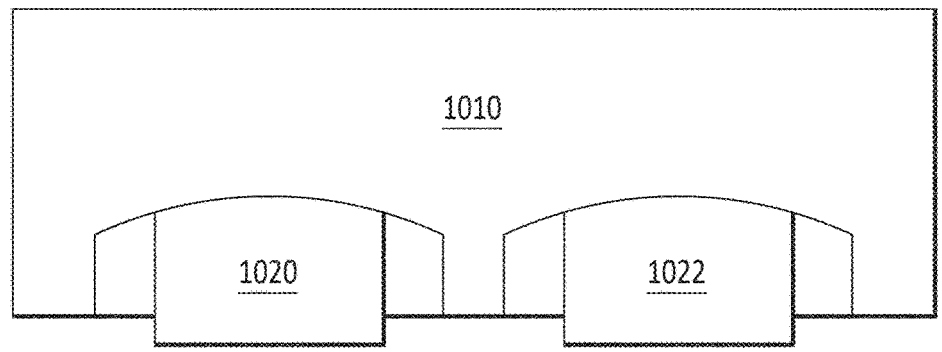
FIGS. 28A and 28B are schematic cross-sectional side views of an automatically adjusting wear block that automatically aligns with a channel surface, further illustrating a method of operation according to additional principles of the present inventive concepts.
Figure 28B:
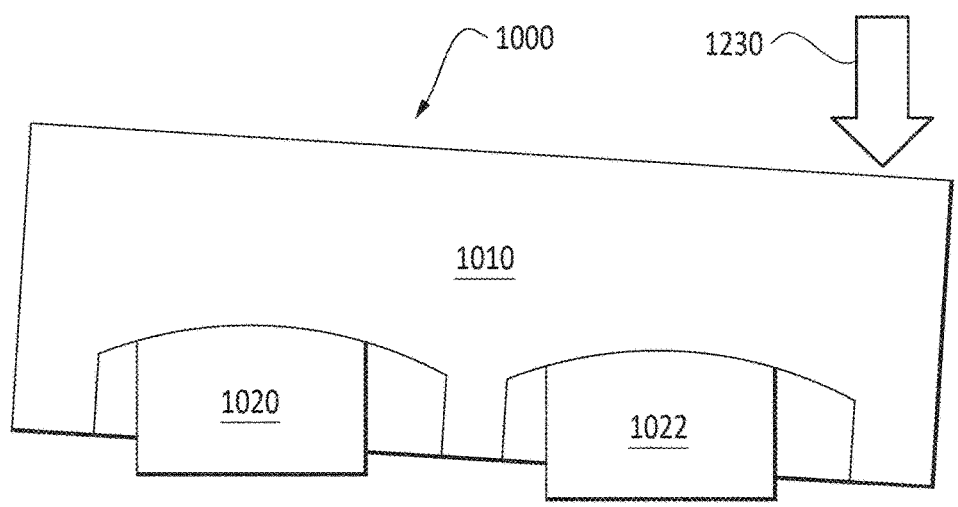

FIG. 27 is a schematic illustration of an automatically adjusting wear block 1000 that further automatically aligns with a channel surface 214*a* according to still other principles of the present inventive concepts. FIGS. 28A and 28B are somewhat schematic cross-sectional side views of an automatically adjusting wear block 1000 that automatically aligns with a channel surface 214*a*, 216*a* further illustrating a method of operation according to additional principles of the present inventive concepts.

Referring now additionally to FIGS. 24-28B, in an alternative embodiment, the auto adjusting wear block 1000 can also be automatically aligned with the channel wall 214*a*, 216*a*. In this embodiment, two or more slave cylinders 1110, 1112 can be provided along a length of the wear block 1000 to drive pistons 1020, 1022 in different areas along the wear pad 1010. By providing multiple slave cylinders 1110, 1112 connected to pistons 1020, 1022 in different areas of the wear pad 1010, each separate area of the wear pad 1010 can be driven by the appropriate amount to contact the shim plate 920 or channel wall 214*a*, 216*a*. When a first side of the wear pad 1010 contacts the shim plate 920 or channel wall 214*a*, 216*a*, the force (represented by arrow 1230) on that side keeps the piston 1022 and wear pad 1010 on that side from moving further. Meanwhile, however, the other piston 1020 can continue to move until the wear pad 1010 contacts the shim plate 920 or wall 214*a*, 216*a* on that side. In this way, different areas of the wear pad 1010 can extend from the wear block 1000 by different amounts to better match the alignment of the channel wall 214*a*, 216*a*.

Figure 29:
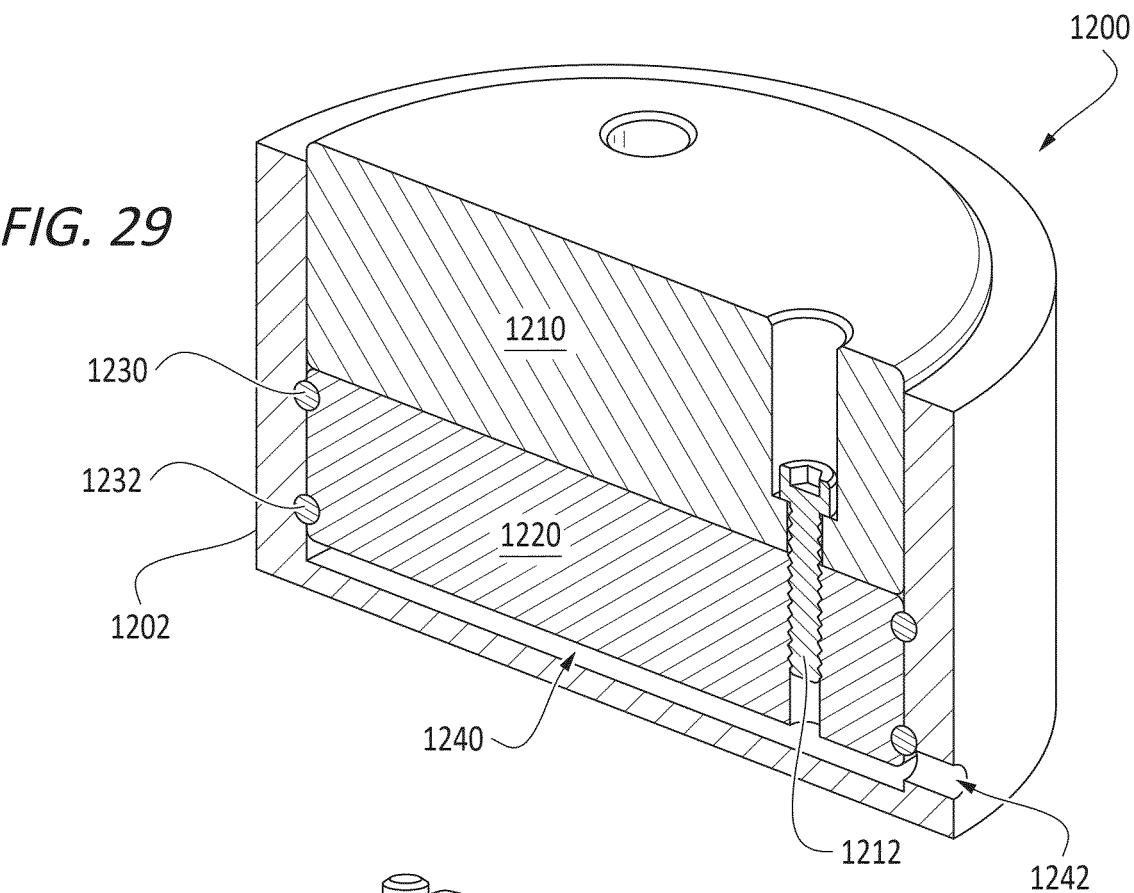
FIG. 29 is a cross-sectional isometric illustration of a hydraulically adjusted wear block according to still further principles of the present inventive concepts.

FIG. 29 is a cross-sectional isometric illustration of a hydraulically adjusted wear block 1200 according to still further principles of the present inventive concepts. Referring to FIG. 29, the hydraulically adjusted wear block can include a housing 1202, a wear pad 1210, and a hydraulic piston 1220. In some embodiments, the hydraulic piston 1220 can be the wear pad 1210. O-rings 1230, 1232 can be provided around the piston 1220 to prevent leakage of the hydraulic fluid. Hydraulic oil or grease can be provided to a cylinder 1240 in the housing 1202 through a grease fitting 1242 to drive the piston 1220 and wear pad 1210 outward. The wear pad 1210 can be connected to the piston 1220 through one or more threaded bolts 1212.

In operation, the piston 1220 and wear pad 1210 are slidably arranged in a receptacle (cylinder) 1240 of the wear block 1200. The one or more O-rings 1230, 1232 are arranged around the piston to seal against the wall of the receptacle 1240 to prevent hydraulic oil or grease from leaking. The oil/grease fitting 1242 is arranged at a bottom of the wear block 1200 to supply oil/grease to the receptacle 1240 to drive the piston 1220 and the connected wear pad 1210 outward until it contacts a shim plate (not shown) or otherwise reaches a desired position.

Figure 30:
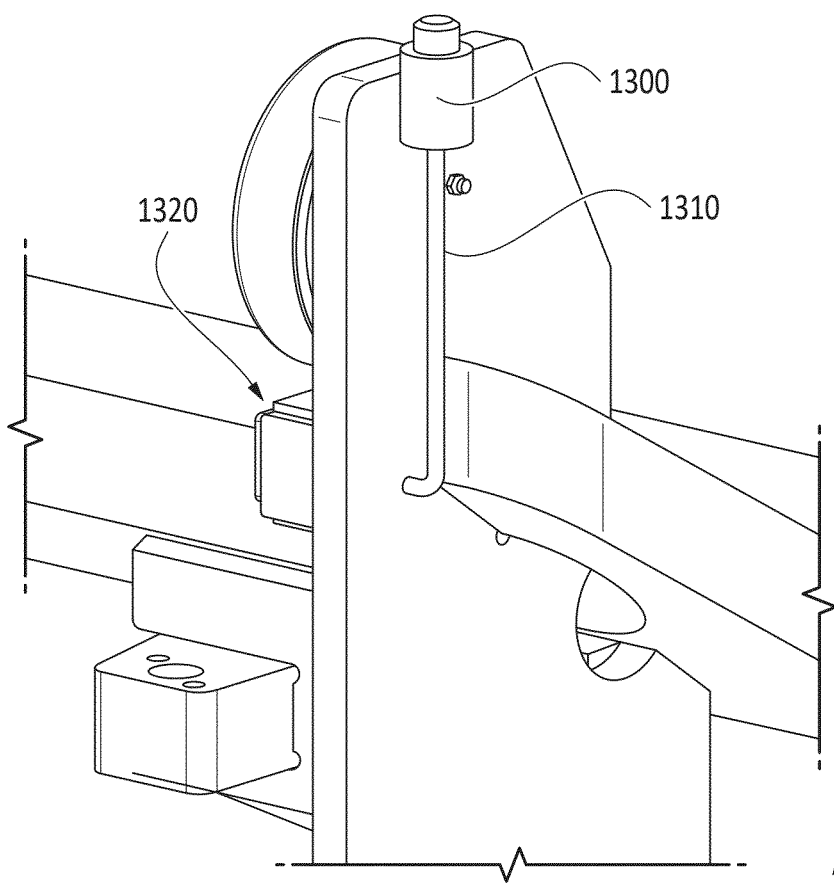
FIGS. 30 and 31 are isometric illustrations showing a hydraulic pump (grease point) and grease lines for supplying hydraulic oil or grease to hydraulically adjusted wear blocks according to still further principles of the present inventive concepts.
Figure 31:
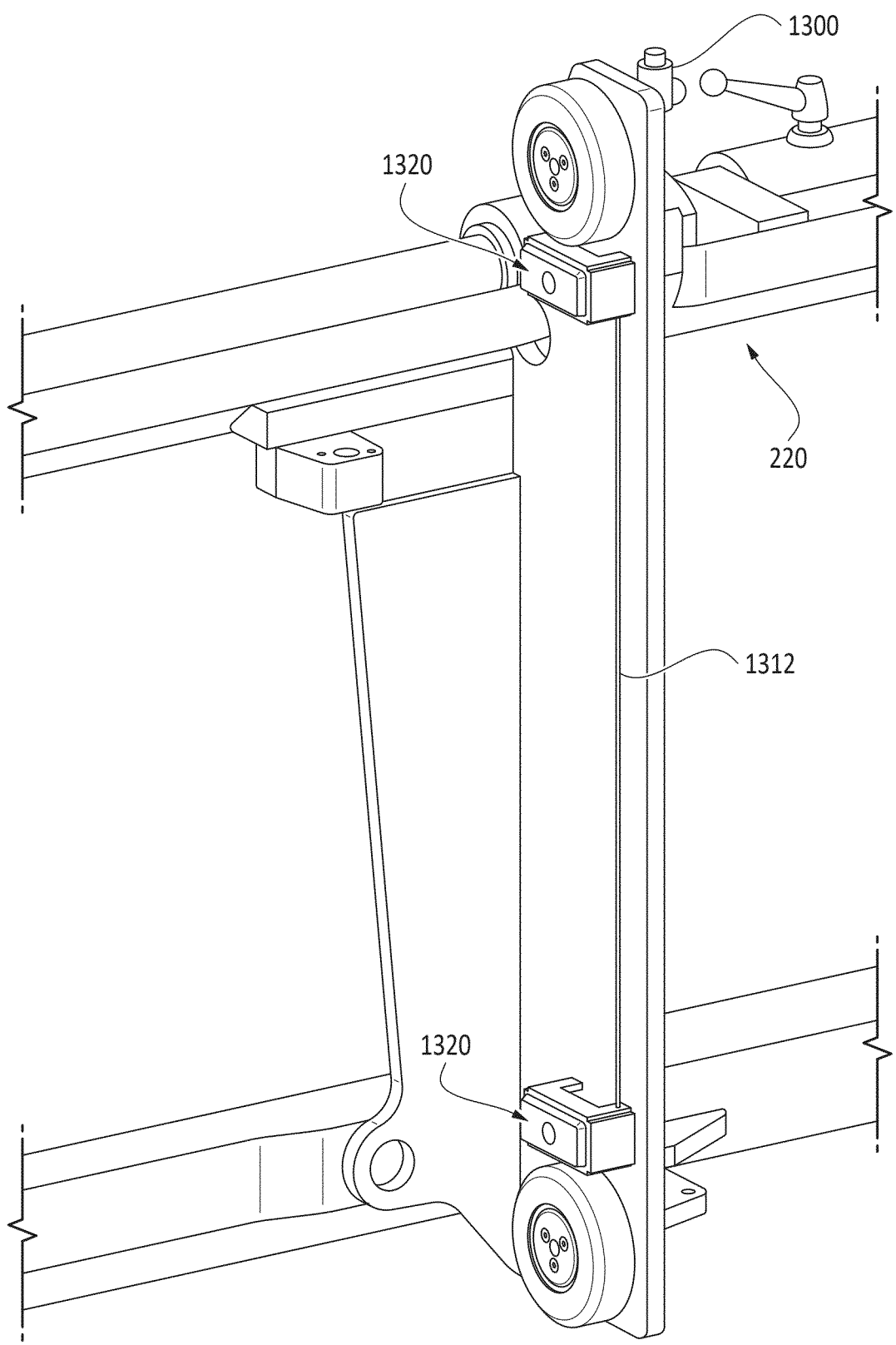

FIGS. 30 and 31 are isometric illustrations showing a hydraulic pump (grease point) 1300 and grease lines 1310, 1312 for supplying hydraulic oil or grease to hydraulically adjusted wear blocks 1320 arranged on a carriage 220 according to still further principles of the present inventive concepts. Referring additionally to FIGS. 30 and 31, one or more grease lines or oil supply lines 1310, 1312 can be used to supply oil/grease to one or more of the wear blocks 1320 from a single grease point (oil supply point) 1300 or multiple grease points 1300. In this embodiment, a hydraulic pump 1300 is configured to supply hydraulic fluid to the grease lines when the carriage 220 is lifted to its highest position in the mast. An operator can use a grease gun or other hydraulic fluid supply (i.e., hydraulic pump) to force oil/grease into the grease points 1300 and through the grease lines 1310, 1312 to drive pistons in the wear blocks 1320 outward. Shim plates can be used to provide a stop point for the outward movement of the wear pads 1320 and ensure a proper clearance with the channel walls 214a, 216a. Alternatively, one or more of the methods described with respect to FIGS. 16A-18 can be used to automatically set the proper clearance.

CONCLUSION

Various other improvements are also contemplated and numerous variations to the specific designs identified above are possible without departing from the spirit and scope of the inventive concepts. Having described and illustrated principles of the present inventive concepts in various preferred embodiments thereof, it should be apparent that the invention can be modified in arrangement and detail without departing from such principles. In particular, it should be apparent that many variations to the shape and construction of the wear block are possible without departing from such principles.

The terms and descriptions used above are set forth by way of illustration and example only and are not meant as limitations. Those skilled in the art will recognize that many variations, enhancements, and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. An adjustable wear block for a mast system, the adjustable wear block comprising:
    a housing separate from a carriage or mast rail and configured to be secured to a mounting surface of the carriage or mast rail, wherein the carriage or mast rail further comprises a receptacle hole for receiving a tool through the receptacle hole to adjust the adjustable wear block;
    a wear pad arranged within a receptacle of the housing and extending from the housing by a selected distance, such that the wear pad can absorb sideways forces on the carriage or mast rail when secured to the carriage or mast rail, and
    wherein the distance by which the wear pad extends from the housing can be adjusted without removing the wear pad from the wear block and without removing the wear block from the carriage or mast rail after the wear block has been secured to the mounting surface of the carriage or mast rail by inserting a tool through the receptacle hole in the carriage or mast rail and into the adjustable wear block and rotating the tool to adjust the distance by which the wear pad extends from the housing.

2. An adjustable wear block according to claim 1, further comprising:
    an adjustable base arranged within the housing receptacle, wherein the wear pad is attached to the adjustable base, and wherein the position of the adjustable base can be adjusted within the housing receptacle to adjust the distance by which the wear pad extends from the housing.

3. An adjustable wear block according to claim 2, wherein the wear pad, the adjustable base, and the housing receptacle each have a circular cross-section.

4. An adjustable wear block according to claim 3, wherein the base comprises threads arranged on an outside of the base, and wherein the receptacle comprises matching threads arranged on a wall of the receptacle, such that a position of the base within the receptacle and a distance by which the wear pad extends from the housing can be adjusted by rotating the base with respect to the housing.

5. An adjustable wear block according to claim 2, wherein the base comprises a tool receptacle configured to receive a tool that can be used to adjust the position of the base with respect to the housing.

6. An adjustable wear block according to claim 5, wherein the carriage or mast rail to which the wear block is secured comprises a hole sized to provide access by a tool to the tool receptacle in the wear block base, wherein the hole is substantially smaller than the adjustable base.

7. An adjustable wear block according to claim 2, further comprising:
    a locking mechanism configured to lock the position of the adjustable base within the housing receptacle.

8. An adjustable wear block according to claim 7, wherein the locking mechanism comprises one or more locking screws configured to engage holes in the carriage or mast wall and the adjustable base to secure the adjustable base to the carriage or mast wall to keep the adjustable base from moving with respect to the housing.

9. An adjustable wear block for a mast system, the adjustable wear block comprising:
    a housing separate from a carriage or mast rail and configured to be secured to a mounting surface of the carriage or mast rail;
    a wear pad arranged within a receptacle of the housing and extending from the housing by a selected distance, such that the wear pad can absorb sideways forces on the carriage or mast rail when secured to the carriage or mast rail, wherein the distance by which the wear pad extends from the housing can be adjusted without removing the wear pad from the wear block and without removing the wear block from the carriage or mast rail after the wear block has been secured to the mounting surface of the carriage or mast rail; and a hydraulic piston arranged within a hydraulic cylinder and configured to adjust the position of the wear pad within the housing receptacle.

10. An adjustable wear block according to claim 9, wherein the hydraulic piston is automatically actuated at a certain point in the travel of the carriage or mast rail to which it is secured.

11. An adjustable wear block according to claim 9, further comprising:
a mechanism that automatically sets a desired clearance between the wear pad and a mast channel wall when the wear block is secured to the carriage or mast rail and the wear pad is adjusted.

12. An adjustable wear block according to claim 9, further comprising:
a first cylinder having a predetermined volume;
a first piston arranged in the first cylinder; and
a check valve arranged through the first piston,
wherein the first cylinder supplies hydraulic fluid to a hydraulic cylinder housing the hydraulic piston, such that hydraulic fluid is supplied from the first cylinder to the hydraulic cylinder as the first piston moves from a first position to a second position within the first cylinder, and wherein additional hydraulic fluid is supplied to the hydraulic cylinder from a fluid source through the check valve in the first piston when the first piston reaches the second position within the first cylinder.

13. An adjustable wear block according to claim 12, wherein the hydraulic fluid supply stops when the wear pad contacts a mast surface, wherein the first piston is allowed to move back from the second position to the first position when the hydraulic fluid supply is stopped, and wherein the predetermined volume of the first cylinder corresponds to a desired clearance between the wear pad and the mast surface, such that a force on the wear pad drives the first piston back toward its first position to establish the desired clearance between the mast surface and the wear pad.

14. An adjustable wear block according to claim 9, further comprising:
multiple hydraulic pistons each arranged in communication with a different area of the wear pad such that a contact surface of the wear pad can automatically adjust to an orientation of a mast surface.

15. An adjustable wear block according to claim 9 further comprising:
a button arranged on the housing and configured to contact a ramp arranged in a mast channel, wherein when the ramp contacts the button, hydraulic fluid is driven from a master cylinder to a slave cylinder arranged behind the hydraulic piston to drive the wear pad outward until it contacts a channel wall or a shim plate.

16. An adjustable wear block according to claim 15, wherein the ramp is arranged at a desired location along the mast channel such that automatic adjustment of the wear pad height occurs at a predetermined mast travel point.

17. An adjustable wear block according to claim 9, further comprising:
one or more fluid supply points where hydraulic fluid can be supplied to the wear block through one or more fluid supply lines.

18. An adjustable wear block according to claim 17, wherein fluid supply lines are connected to multiple wear blocks to supply hydraulic fluid to the wear blocks from a single fluid supply point.

19. A method of adjusting a height of a wear pad arranged on an adjustable base in a wear block that is secured to a mounting surface of a carriage or mast rail, the method comprising:
inserting an adjustment tool through a receptacle hole in a carriage or mast wall and into a tool receptacle in a base of a wear block housing, wherein the receptacle hole is sized to receive an end of the adjustment tool but is substantially smaller than the adjustable base; and
rotating the adjustment tool to adjust a position of the adjustable base with respect to the wear block housing, wherein a height of the wear pad is adjusted along with the position of the adjustable base.

20. A method according to claim 19, further comprising:
rotating the adjustment tool in a first direction until the wear pad contacts a channel wall, and then rotating the adjustment tool in a second, opposite direction to provide a clearance between the channel wall and the wear pad.

21. A method according to claim 20, wherein a plurality of markings are provided around the hole in the carriage or mast wall to indicate a linear travel distance of the wear pad that corresponds to rotational movement of the adjustment tool.

22. A method according to claim 21, wherein each marking corresponds to a linear travel distance of 0.5 mm.

23. A method according to claim 21, further comprising rotating the adjustment tool until the wear pad makes contact with a channel wall and then rotating the adjustment tool back by two full rotations to provide a desired clearance.

24. A method according to claim 19, further comprising:
removing one or more locking screws that engage holes in the carriage or mast wall and the adjustable base to lock the position of the base with respect to the wear block housing before rotating the adjustment tool.

* * * * *